(12) United States Patent
Murata et al.

(10) Patent No.: US 11,586,787 B2
(45) Date of Patent: Feb. 21, 2023

(54) FRICTION DESIGN METHOD AND SURFACE ROUGHNESS CONTROL METHOD FOR SLIDING MEMBER AND PRODUCTION METHOD FOR SLIDING MECHANISM

(71) Applicant: NSK Ltd., Tokyo (JP)

(72) Inventors: Yohei Murata, Fujisawa (JP); Tomohiro Motoda, Fujisawa (JP); Hideyuki Uyama, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 17/415,834

(22) PCT Filed: Dec. 22, 2020

(86) PCT No.: PCT/JP2020/047976
§ 371 (c)(1),
(2) Date: Jun. 18, 2021

(87) PCT Pub. No.: WO2021/215050
PCT Pub. Date: Oct. 28, 2021

(65) Prior Publication Data
US 2022/0058304 A1 Feb. 24, 2022

(30) Foreign Application Priority Data
Apr. 24, 2020 (JP) .............................. JP2020-077335

(51) Int. Cl.
*G06F 30/17* (2020.01)
*F16C 33/64* (2006.01)
(Continued)

(52) U.S. Cl.
CPC ............ *G06F 30/17* (2020.01); *F16C 19/364* (2013.01); *F16C 33/585* (2013.01); *F16C 33/64* (2013.01);
(Continued)

(58) Field of Classification Search
CPC .... F16C 33/64; G06F 17/00–11; G06F 30/17; G06F 2111/10
See application file for complete search history.

(56) References Cited

U.S. PATENT DOCUMENTS

| | | | |
|---|---|---|---|
| 5,462,362 | A | 10/1995 | Yuhta et al. |
| 2002/0010051 | A1 | 1/2002 | Ushijima et al. |

(Continued)

FOREIGN PATENT DOCUMENTS

| | | |
|---|---|---|
| JP | 8-4770 A | 1/1996 |
| JP | 2000-179559 A | 6/2000 |

(Continued)

OTHER PUBLICATIONS

English translation of Japanese Written Opinion (PCT/ISA/237) issued in PCT Application No. PCT/JP2020/047976 dated Mar. 23, 2021 filed on Jun. 19, 2021 (four (4) pages).

(Continued)

*Primary Examiner* — Alan B Waits
(74) *Attorney, Agent, or Firm* — Crowell & Moring LLP

(57) ABSTRACT

Provided is a friction design method capable of estimating sliding friction generated between mutual sliding surfaces of two sliding members lubricated with lubricant with high precision. The friction design method sets a friction coefficient $\mu$ in a sliding surface model corresponding to mutual sliding surfaces of two sliding members (2 and 3) lubricated with lubricant (step S1), and, based on a correlation between the friction coefficient $\mu$ and an oil film parameter ($\Lambda(Rk)$ or $\Lambda(Rk+Rpk)$) calculated using a core portion level difference (Rk) or a sum of the core portion level difference (Rk) and reduced peak height (Rpk) as a parameter representing surface roughness in the sliding surface model (step S2), sets a target value for surface roughness of the sliding surfaces required to be controlled as a product (steps S3 to S6).

20 Claims, 15 Drawing Sheets

(51) Int. Cl.
*F16C 19/36* (2006.01)
*F16C 33/58* (2006.01)
*F16C 33/66* (2006.01)
*G06F 111/10* (2020.01)

(52) U.S. Cl.
CPC ...... *F16C 33/6651* (2013.01); *F16C 2240/54* (2013.01); *G06F 2111/10* (2020.01)

(56) References Cited

U.S. PATENT DOCUMENTS

| | | | |
|---|---|---|---|
| 2005/0047700 A1 | 3/2005 | Tsujimoto | |
| 2014/0037236 A1* | 2/2014 | Kobayakawa | F16C 33/201 384/397 |
| 2015/0192195 A1 | 7/2015 | Okamoto et al. | |

FOREIGN PATENT DOCUMENTS

| | | | |
|---|---|---|---|
| JP | 2001-263443 A | | 9/2001 |
| JP | 2002-106552 A | | 4/2002 |
| JP | 2003-4043 A | | 1/2003 |
| JP | 2005-76675 A | | 3/2005 |
| JP | 2007-321806 A | | 12/2007 |
| JP | 2008-45573 A | | 2/2008 |
| JP | 2014-95392 A | | 5/2014 |
| KR | 100412558 B1 | * | 12/2003 |
| WO | WO-9719278 A1 | * | 5/1997 ................ F01L 1/16 |

OTHER PUBLICATIONS

International Search Report (PCT/ISA/210) issued in PCT Application No. PCT/JP2020/047976 dated Mar. 23, 2021 with partial translation (five (5) pages).

Japanese-language Written Opinion (PCT/ISA/237) issued in PCT Application No. PCT/JP2020/047976 dated Mar. 23, 2021 (seven (7) pages).

S. Aihara, "A new running torque formula for tapered roller bearings under axial load", Transactions of the ASME. Journal of tribology, vol. 109, 1987, pp. 471-478 (eight (8) pages).

Yuji Yamamoto and Motohiro Kaneta, Tribology, p. 124 with partial English translation (five (5) pages).

Tokunaga, Sugimura, and Yamamoto, "Development and performance verification in mechanical seals with friction reduction and sealing mechanism: Experimental Study", Journal of Japanese Society of Triboloaists vol. 60, No. 5, 2015, pp. 332 with English abstract (10 pages).

Kaneta, "Micro• EHL", Journal of Japanese Society of Tribologists, vol. 35, No. 1, 1990, pp. 8 with partial English translation (seven (7) pages).

I. Krupka, R. Poliscuk, and M. Hartl, "Behavior of thin viscous boundary films in lubricated contacts between micro•textured surfaces", Tribology Int., vol. 42, 2009, pp. 535 (four (4) pages).

Maeda, Maruyama, and Nakano, "Simultaneous Measurement of Film Thickness and Fracture Rate in EHD Contact", Tribology Conference 2017 Fall in Takamatsu, Proceedings, A39 with partial English translation (four (4) pages).

International Preliminary Report on Patentability (PCT/IB/338 & PCT/IB/373) issued in PCT Application No. PCT/JP2020/047976 dated Nov. 3, 2022, including English translation of document C2 (Japanese-language Written Opinion (PCT/ISA/237) filed on Jun. 18, 2021) (six (6) pages).

* cited by examiner

RANDOM SURFACE (Ra 0.069μm)

PLATEAU SURFACE (Ra 0.065μm)

FIG. 6A BALL SURFACE
FIG. 6B SURFACE 1
FIG. 6C SURFACE 2
FIG. 6D SURFACE 3
FIG. 6E SURFACE 4
FIG. 6F SURFACE 5
FIG. 6G SURFACE 6

SMALL

← RATIO OF VALLEY PORTIONS →

LARGE

EXAMPLE OF SURFACE HAVING DEEP GROOVES
(Rq=0.084μm, Rk=0.071, Rk+Rpk=0.094μm)

ROUGHNESS CURVE AND MATERIAL RATIO CURVE THEREOF

DIFFERENT SECTION LEVELS
ON MATERIAL RATIO CURVE OF ROUGHNESS

FRICTION DESIGN METHOD AND SURFACE ROUGHNESS CONTROL METHOD FOR SLIDING MEMBER AND PRODUCTION METHOD FOR SLIDING MECHANISM

TECHNICAL FIELD

The present invention relates to a friction design method and a surface roughness control method for mutual sliding surfaces of two sliding members lubricated with lubricant (for example, mutual facing surfaces of a roller head portion and a large flange portion of a tapered roller bearing) and a production method for a sliding mechanism having sliding surfaces of this type.

BACKGROUND ART

Examples of a sliding mechanism that has sliding surfaces and is constituted by sliding members between which sliding friction is generated because of sliding include a rolling bearing, a sliding bearing, a ball screw, and gears. In such a sliding mechanism, although an interspace between the mutual sliding surfaces of the sliding members is lubricated by grease or lubricating oil, friction between the sliding members is high at low operating speed because sufficient oil film is not formed. Hence, torque reduction in a low operating speed range is expected.

In the case of a rolling bearing, for example, a tapered roller bearing is used as a bearing in a part like a transmission, a differential, or a transaxle. A tapered roller bearing, although having a strength in that rigidity and load capacity are larger than other types of bearings, has shortcomings in that torque in a low rotation range is comparatively high, due to the mechanism thereof. In particular, a differential has a tendency that a frequently used rotation range is as low as several hundreds of rpm and torque in the low rotation range is high. Hence, torque reduction in such a low rotation range is expected.

The reason for the fact that torque of a tapered roller bearing is high in a low rotation range is that mutual sliding surfaces of roller head portions and a large flange portion are in a rolling-sliding contact and lubrication conditions between the sliding surfaces are in the boundary lubrication, in which the sliding surfaces are partially in a solid contact with each other, or the mixed lubrication.

In other words, regarding the tapered roller bearing, making the lubrication conditions between the mutual sliding surfaces of the roller head portions and the large flange portion transition to the hydrodynamic lubrication, in which the sliding surfaces are separated from each other by oil film, by increasing oil film thickness by use of high-viscosity oil and reducing surface roughness enables friction in the low rotation range to be reduced.

However, reduction in viscosity of lubricating oil aimed at reduction in fuel consumption has progressed recent years, and lubricating oil having a kinetic viscosity of 30 cSt at 40° C. (7 cSt at 100° C.) or less is generally used. It is expected that reduction in viscosity of lubricating oil further progresses in the future and lubricating oil having a kinetic viscosity of 20 cSt at 40° C. or less is to be used.

Therefore, it is not possible to employ, as a method for reducing friction generated between the mutual sliding surfaces of the roller head portions and the large flange portion of a tapered roller bearing, a method of increasing oil film thickness by increasing viscosity of lubricating oil, and reducing minuscule unevenness (roughness) existing on a surface of a sliding surface becomes a main method for friction reduction.

An attempt to predict sliding friction generated between mutual sliding surfaces of a roller head portion and a large flange portion as a function of an oil film parameter $\Lambda$ that represents a contact state between sliding members (NPL 1) has been performed. A method described in the literature uses root-mean-square roughness Rq as a parameter representing roughness of a surface and estimates sliding friction generated between the mutual sliding surfaces of a roller head portion and the large flange portion of a tapered roller bearing.

CITATION LIST

Non Patent Literature

NPL 1: S. Aihara, "A new running torque formula for tapered roller bearings under axial load", Transactions of the ASME. Journal of tribology, vol. 109, 1987, pp. 471-478

NPL 2: Yuji Yamamoto and Motohiro Kaneta, Tribology, P124

NPL 3: Tokunaga, Sugimura, and Yamamoto, "Development and performance verification in mechanical seals with friction reduction and sealing mechanism: Experimental Study", Journal of Japanese Society of Tribologists, vol. 60, no. 5, 2015, pp. 332

NPL 4: Kaneta, "Micro-EHL", Journal of Japanese Society of Tribologists, vol. 35, no. 1, 1990, pp. 8

NPL 5: I. Krupka, R. Poliscuk, and M. Hartl, "Behavior of thin viscous boundary films in lubricated contacts between micro-textured surfaces", Tribology Int., vol. 42, 2009, pp. 535

NPL 6: Maeda, Maruyama, and Nakano, "Simultaneous Measurement of Film Thickness and Fracture Rate in EHD Contact", Tribology Conference 2017 Fall in Takamatsu, Proceedings, A39

SUMMARY OF INVENTION

Technical Problem

However, an earnest examination by the inventors of the claimed invention has revealed that, as will be described later, there is a problem in that, when an oil film parameter $\Lambda(Rq)$ or $\Lambda(Ra)$ that is calculated using root-mean-square roughness Rq or arithmetic mean roughness Ra is employed as a parameter representing roughness of a surface, sliding friction generated between mutual sliding surfaces of two sliding members lubricated with lubricant cannot necessarily be classified significantly as a function of the oil film parameter $\Lambda(Rq)$ or $\Lambda(Ra)$ for a surface shape having a bias in the height distribution of roughness (for example, a plateau surface having recessed grooves or holes on a smooth surface) and the sliding friction cannot be estimated with high precision.

Accordingly, the present invention has been made in view of the problem as described above and a problem to be solved by the present invention is to provide a friction design method and a surface roughness control method for a sliding member and a production method for a sliding mechanism that are capable of estimating sliding friction generated between mutual sliding surfaces of two sliding members lubricated with lubricant with high precision.

Solution to Problem

In order to solve the above-described problem, a friction design method for a sliding member according to one aspect of the present invention, based on a correlation between a friction coefficient acquired using a sliding surface model corresponding to mutual sliding surfaces of two sliding members lubricated with lubricant and an oil film parameter calculated using a core portion level difference or a sum of the core portion level difference and reduced peak height as a parameter representing surface roughness in the sliding surface model, sets a target value for surface roughness of the mutual sliding surfaces of the two sliding members required to be controlled as a product.

In the friction design method for the sliding member according to the one aspect of the present invention, the method may calculate a target oil film parameter value corresponding to the target value from a correlation between the friction coefficient and the oil film parameter and, by calculating a composite roughness $\sigma^*$ of sliding surfaces corresponding to the target value from the calculated target oil film parameter value and an estimated or actually measured oil film thickness of lubricant between the mutual sliding surfaces of the two sliding members, set a target value for a core portion level difference of surface roughness of the sliding surface required to be controlled as a product or a target value for a sum of a core portion level difference and reduced peak height of surface roughness of the sliding surface required to be controlled as a product.

In the friction design method for the sliding member according to the one aspect of the present invention, the method may use two-dimensional roughness parameters (Rk and Rpk) as the core portion level difference and the reduced peak height.

In the friction design method for the sliding member according to the one aspect of the present invention, the method may use three-dimensional roughness parameters (Sk and Spk) as the level difference of the core portion and the reduced peak height.

In order to solve the above-described problem, a surface roughness control method for a sliding member according to another aspect of the present invention uses the friction design method according to the one aspect of the present invention and sets a target value for a core portion level difference of surface roughness of the sliding surface required to be controlled as a product or a target value for a sum of a core portion level difference and reduced peak height of surface roughness of the sliding surface as an acceptance criterion for roughness in processing of a surface of the sliding member.

In the surface roughness control method for the sliding member according to the another aspect of the present invention, the method may perform control, further using, as the acceptance criterion for roughness in processing, whether or not a value representing a ratio Svr of a valley portion within surface unevenness of the sliding surface required to be controlled as a product satisfies a formula below:

Svr ≤ a predetermined value    (Formula).

In the above formula, Svr is a ratio of a valley portion within surface unevenness on the sliding surface that is calculated from 100−Mr2, 100−Rmr, 100−Smr2, or 100−Smr, where Mr2 and Rmr are two-dimensional roughness parameters, Mr2 is a material ratio of a core portion of the sliding surface required to be controlled as a product, and Rmr is a relative material ratio of the sliding surface required to be controlled as a product and Smr2 and Smr are three-dimensional roughness parameters, Smr2 is an areal material ratio of a core portion of the sliding surface required to be controlled as a product, and Smr is a relative areal material ratio of the sliding surface required to be controlled as a product. Note that a range defined by the above-described formula is a range in which a deviation amount $\Delta\mu$ from a reference is equal to or less than a certain value.

In order to solve the above-described problem, a production method for a sliding mechanism according to still another aspect of the present invention is a method for producing a sliding mechanism including mutual sliding surfaces of two sliding members and lubricant lubricating an interspace between the mutual sliding surfaces of the two sliding members, in which the method produces the sliding mechanism, using sliding members classified as acceptable products by the surface roughness control method for the sliding member according to the another aspect of the present invention.

In order to solve the above-described problem, the surface roughness control method for the sliding member according to the another aspect of the present invention measures friction under a rolling-sliding condition using a ball with a groove and, based on a result of the measurement, controls a groove area ratio of the groove to a predetermined value or less in such a way as to satisfy a control condition for a desired surface roughness. As an example, the groove is parallel grooves. Note that the groove is not limited to parallel grooves and may be an orthogonal groove that is orthogonal to a sliding direction, crossing grooves, a circumferential groove, random grooves that have no certain directionality for the groove direction, or grooves or indentations that have no continuity.

As will be described later based on an example, the surface roughness control method for the sliding member according to the another aspect of the present invention, from a result of confirmation of influence of a groove on oil film thickness and friction under a rolling-sliding condition, enables knowledge that, caused by the oil film thickness locally decreasing at a groove edge portion of the groove and, depending on a groove area ratio, the oil film thickness decreasing not only at a groove edge portion but also over the entire range, in a mixed lubrication region, the friction becomes large in association with increase in the groove area ratio of the groove and, in a hydrodynamic lubrication region, the friction, although not as prominent as the increase influenced by the groove area ratio in the mixed lubrication region, slightly increases as the depth of the groove increases to be obtained.

Accordingly, the surface roughness control method according to the another aspect of the present invention, based on the knowledge, enables the groove area ratio of the groove to be controlled to a predetermined value or less in such a way as to satisfy a control condition for desired surface roughness. Thus, the present invention enables a roughness control method capable of satisfying a control condition for desired surface roughness under the rolling-sliding condition in the case where a groove exists on the surface to be provided.

Advantageous Effects of Invention

The present invention enables sliding friction generated between mutual sliding surfaces of two sliding members lubricated with lubricant to be estimated with high precision.

BRIEF DESCRIPTION OF DRAWINGS

FIG. 3A is a schematic diagram of a main portion and FIG. 3B is a partial enlarged view of a portion of FIG. 3A;

DESCRIPTION OF EMBODIMENTS

One embodiment (including examples) of the present invention will be described below with reference to the drawings as appropriate. Note that the drawings are schematic. Therefore, it should be noted that relations between thicknesses and planar dimensions, ratios, and the like are different from actual ones and portions having different dimensional relationships and ratios from one another among the drawings are included.

In addition, the following embodiment (including examples) indicates devices and methods to embody the technical idea of the present invention by way of example, and the technical idea of the present invention does not limit the materials, shapes, structures, arrangements, and the like of the constituent components to those described below.

Figure 2:
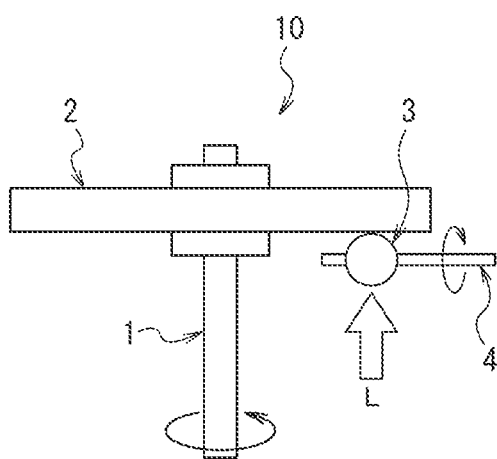
FIG. 2 is a schematic diagram descriptive of an example of a friction test device used in the friction design, control, and production method according to the present embodiment and a test condition thereof.

For example, a correlation between a friction coefficient and an oil film parameter may be obtained by, instead of operating a friction test device as illustrated in FIG. 2, rotating a tapered roller bearing itself and measuring torque generated in so doing.

Friction Design Method and Roughness Control Method Using the Same and Production Method for Sliding Mechanism of Present Embodiment Hereinafter, a method for designing, controlling, and producing surface roughness of two sliding members, which are produced into a product, using a sliding surface model corresponding to mutual sliding surfaces of the two sliding members that are lubricated with lubricant, based on a relationship between a friction coefficient μ and an oil film parameter Λ that is obtained by actually measuring the relationship between friction coefficient μ and the oil film parameter Λ through an experiment will be described.

In particular, a friction design method and a surface roughness control method for a sliding member and a production method for a sliding mechanism of the present embodiment are methods for designing and controlling surface roughness of mutual sliding surfaces of two sliding members to be designed and controlled by calculating an oil film parameter Λ(Rk) or Λ(Rk+Rpk) by use of a level difference Rk of a core portion or Rk+Rpk as a parameter representing roughness of the mutual sliding surfaces of the sliding members lubricated with lubricant and controlling sliding friction generated between the mutual sliding surfaces of the sliding members lubricated with lubricant in such a way that a target friction coefficient μ is achieved and, in conjunction therewith, producing a sliding mechanism, using the two sliding members. Note that, in the present description, the sliding mechanism refers to a mechanical structure that has a sliding mechanism including mutual sliding surfaces of two sliding members and lubricant lubricating an interspace between the mutual sliding surfaces of the two sliding members. For example, facing surfaces of a roller head portion and a large flange portion of a tapered roller bearing may be targeted as a sliding mechanism of this type.

Figure 1:
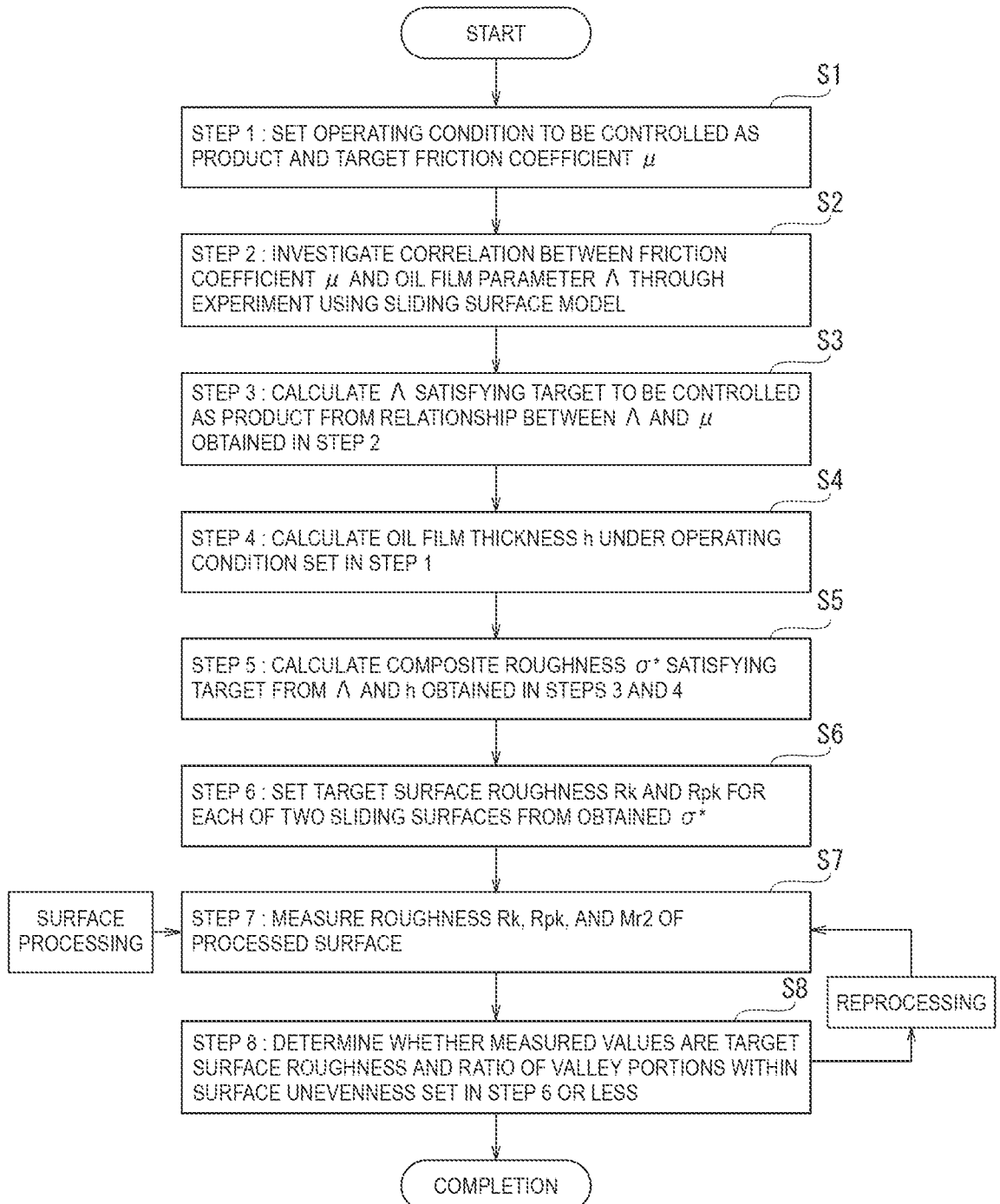
FIG. 1 is a flowchart illustrative of a friction design, control, and production method that is one embodiment of the present invention, and the drawing illustrates, in order, steps in the friction design, control, and production method relating to surfaces of two sliding members lubricated with lubricant, the method using a correlation between a friction coefficient μ and an oil film parameter Λ(Rk) or Λ(Rk+Rpk)

Specifically, as illustrated in a flow of process steps in FIG. 1, in step S1, operating conditions (rolling velocity, load, temperature, lubricating oil viscosity, and the like) required to be controlled as a product and a target friction coefficient μ are set [step 1]. In an example of the present embodiment, a target friction coefficient μ under a predetermined operating condition A in a friction test using a sliding surface model in which a friction test device 10 illustrated in FIG. 2 is used is set as μ≤0.05.

The test device 10 has a sliding surface model set up therein, the sliding surface model modeling mutual sliding surfaces of two sliding members lubricated with lubricant, as illustrated in FIG. 2. In other words, the test device 10 includes a drive shaft 1 the axis of which is arranged vertical, and, at the upper end of the drive shaft 1, a disk (with a diameter of ϕ100 mm) 2 that is made of steel and corresponds to one of the sliding members is supported in a horizontal posture. Onto the under surface of the steel disk 2, a ball (with a diameter of ϕ25.4 mm) 3 that is made of steel and corresponds to the other of the sliding members is pressed with a predetermined surface pressure L. The steel ball 3 is supported by a horizontal rotation axis 4 in a rotatable manner about the rotation axis 4.

Note that, in the present embodiment, the "predetermined operating condition A" in the test device 10 is as follows: test oil, Durasyn 166 (31 cSt at 40° C.); test temperature, 25° C. (room temperature); sliding ratio, 15%; rolling velocity, 0.1 m/s; load, 9.8 N; and surface pressure, 0.5 GPa.

Next, as illustrated in FIG. 1, in succeeding step S2, a relationship between the friction coefficient μ and the oil film parameter Λ is measured with respect to sliding surface models modeling the mutual sliding surfaces of the two sliding members 2 and 3 lubricated with lubricant through an experiment using the friction test device 10 [step 2].

In the present embodiment, in order to measure a relationship between the oil film parameter Λ and the friction coefficient μ over a wide range (0<Λ<3 or more), an experiment was performed using a plurality of surfaces 1 to 6 the surface roughness magnitudes of which are different from one another as sliding surface models modeling the mutual sliding surfaces of the two sliding members 2 and 3 lubricated with lubricant under a predetermined operating condition B in a friction test using the friction test device 10 illustrated in FIG. 2. The roughness of surfaces used as sliding surface models are illustrated in Table 1 and FIGS. 6A to 6G. The predetermined operating condition B is as follows:

test oil, Durasyn 166 (31 cSt at 40° C.); test temperature, 25° C. (room temperature); sliding ratio, 15%; rolling velocity, 0.01 m/s to 0.5 m/s; load, 9.8 N; and surface pressure, 0.5 GPa.

TABLE 1

| | | Disk | | | | | |
| --- | --- | --- | --- | --- | --- | --- | --- |
| | | Random surface | | | Plateau surface | | |
| | Ball | Surface 1 | Surface 2 | Surface 3 | Surface 4 | Surface 5 | Surface 6 |
| Rq, um | 0.010 | 0.020 | 0.049 | 0.089 | 0.058 | 0.098 | 0.145 |
| Rk, um | 0.023 | 0.046 | 0.110 | 0.195 | 0.024 | 0.060 | 0.113 |
| Rpk, um | 0.008 | 0.013 | 0.036 | 0.093 | 0.005 | 0.013 | 0.011 |
| σ* (Rq), um | — | 0.022 | 0.050 | 0.090 | 0.059 | 0.099 | 0.146 |
| σ* (Rk), um | — | 0.051 | 0.112 | 0.197 | 0.033 | 0.064 | 0.116 |
| σ* (Rk + Rpk), um | — | 0.067 | 0.150 | 0.289 | 0.042 | 0.079 | 0.128 |

Figure 11A:
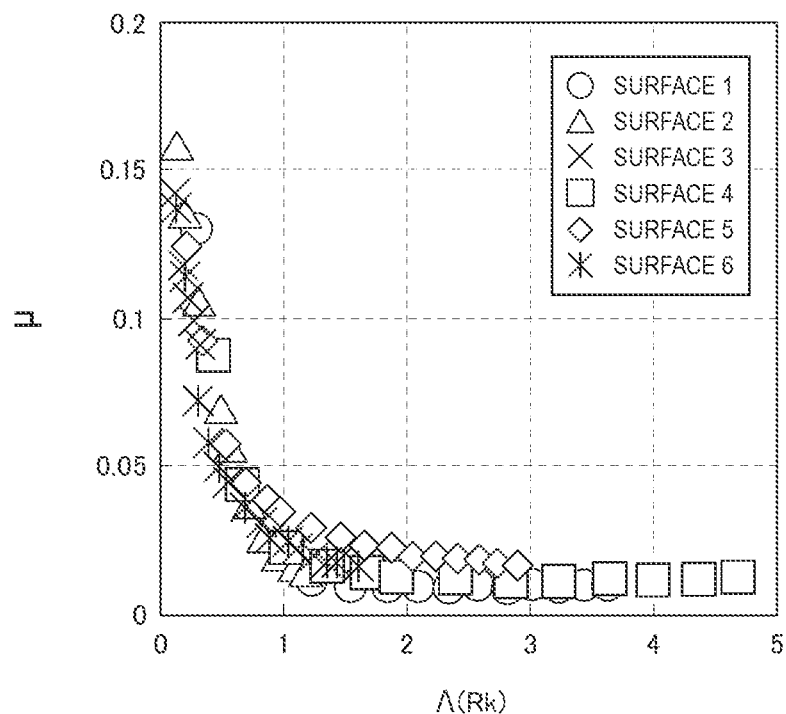
FIGS. 11A and 11B are graphs illustrative of, with respect to the sliding surface models illustrated in FIGS. 6A to 6G, a correlation between the oil film parameter Λ(Rk) calculated using Rk as a roughness parameter and the friction coefficient μ (FIG. 11A) and a correlation between the oil film parameter Λ(Rk+Rpk) calculated using Rk+Rpk and the friction coefficient μ (FIG. 11B)
Figure 11B:
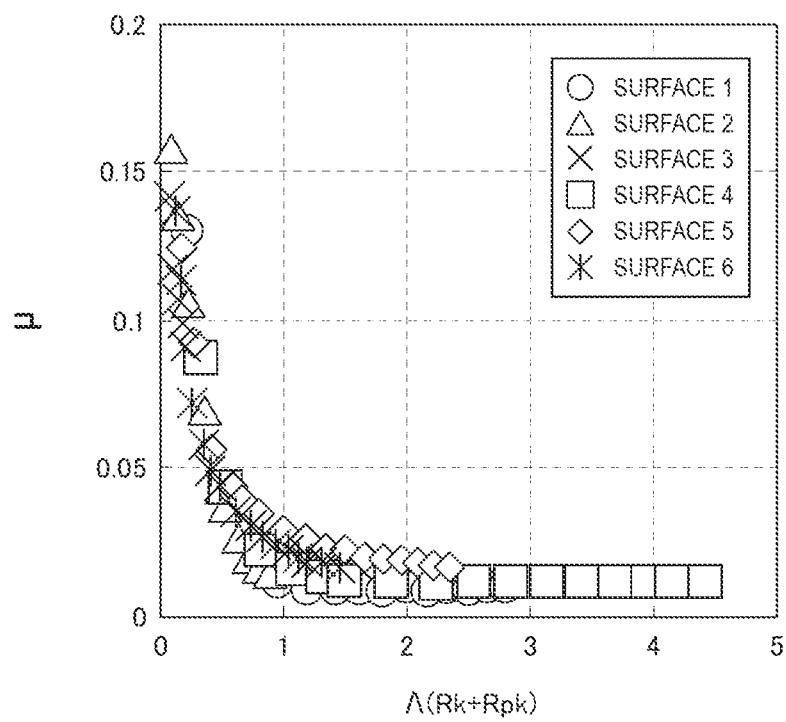

A result of measurement in which friction coefficients were measured changing the rolling velocity to various values with respect to each of the surfaces 1 to 6 of the plurality of sliding surface models illustrated in Table 1 and FIGS. 6A to 6G is illustrated in FIGS. 11A and 11B. Note that, in FIGS. 11A and 11B, oil film thicknesses h under the respective conditions are calculated using the Hamrock-Dowson film thickness formula, oil film parameters Λ at respective test points are calculated from surface roughness values shown in Table 1, and the calculated oil film parameters Λ are used for the abscissas of the graphs.

In the present embodiment, by representing roughness a of a surface by, instead of root-mean-square roughness Rq, a level difference Rk of a core portion or a sum Rk+Rpk of the level difference Rk of the core portion and reduced peak height Rpk, a composite roughness σ* is calculated. Note that, in the present embodiment, the composite roughness σ* that is required for classifying correlations according to the oil film parameter Λ is calculated from the square root $(\sigma_1^2+\sigma_2^2)^{0.5}$ of the square sum of respective roughness values.

However, if representing the composite roughness σ* by a sum $(\sigma_1+\sigma_2)$ of respective roughness values enables a relationship between the oil film parameter Λ(Rk+Rpk) and the friction coefficient μ to be classified better, the composite roughness σ* may be represented by, instead of the square root $(\sigma_1^2+\sigma_2^2)^{0.5}$ of the square sum of respective roughness values, the sum $(\sigma_1+\sigma_2)$ of respective roughness values. Herein, an example in which Rk+Rpk is used as the roughness of a surface and the composite roughness σ* is calculated from the square root $(\sigma_1^2+\sigma_2^2)^{0.5}$ of the square sum of respective roughness values will be described.

Next, in step S3 in FIG. 1, a value of a target oil film parameter Λ(Rk+Rpk) that is required to be controlled as a product and satisfies a target is calculated from the relationship between the oil film parameter Λ(Rk+Rpk) and the friction coefficient μ obtained in step S2 [step 3].

Specifically, an approximate curve representing the correlation between the friction coefficient μ and the oil film parameter Λ(Rk+Rpk) is calculated using data in the vicinity of a point where p=0.05, which is the above-described target value, and a value of the oil film parameter Λ(Rk+Rpk) when the approximate curve satisfies p=0.05 is set as a value of the target oil film parameter Λ(Rk+Rpk). As a result, as a value of the target oil film parameter Λ(Rk+Rpk), an oil film parameter Λ(Rk+Rpk)=0.49 can be obtained.

In succeeding step S4, an oil film thickness h of oil film formed between the mutual sliding surfaces of the two sliding members 2 and 3 under the predetermined operating condition A using the friction test device 10 in step S1 is calculated using the Hamrock-Dowson film thickness formula of point contact EHL in NPL 2 [step 4]. As a result, the oil film thickness h is calculated to be 0.063 μm. Note that a film thickness formula for calculating an oil film thickness h used in the present embodiment will be described later.

Next, in step S5, a composite roughness σ* that satisfies the target is calculated from the oil film parameter Λ(Rk+Rpk) and the oil film thickness h obtained in the above-described steps 3 and 4 [step 5]. In the example of the present embodiment, σ(Rk+Rpk)* is calculated to be 0.129 μm from Λ(Rk+Rpk)=0.49 and h=0.063 μm.

Next, in step S6, a surface roughness that satisfies σ*[= $(\sigma_1^2+\sigma_2^2)^{0.5}$] that was calculated in the above-described step 5 is set as a target value of surface roughness required to be controlled as a product [step 6]. When the roughness of the mutual solid surfaces of the two sliding members 2 and 3 are the same, the surface roughness is calculated as a value obtained by dividing σ* by √2. In the example of the present embodiment, since σ(Rk+Rpk)*=0.129 μm, the surface roughness in the case where the two sliding members 2 and 3 have the same surface roughness is calculated as Rk+Rpk=0.091 μm.

Next, in step S7, the mutual sliding surfaces of the two sliding members 2 and 3 are processed to produce a desired product, and, subsequently, the surface roughness of the processed sliding surfaces are measured and a level difference Rk of a core portion, a reduced peak height Rpk, and a material ratio Mr2 of the core portion are obtained [step 7].

Although the measurement in the step 7 basically conforms to JIS B0633, it is not that the measurement can be performed at any points on the sliding surfaces, and the measurement needs to be performed at points at which the two sliding members 2 and 3 come into contact with each other.

Figure 3A:
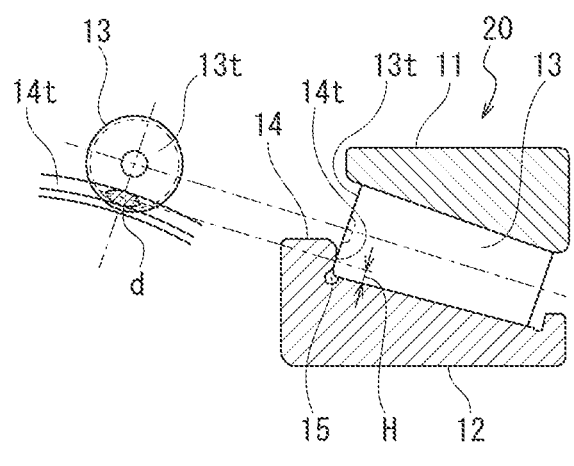
FIGS. 3A and 3B are diagrams descriptive of an application example to mutual facing surfaces of a roller head portion and a large flange portion of a tapered roller bearing as a sliding mechanism including mutual sliding surfaces of two sliding members and lubricant lubricating an interspace between the mutual sliding surfaces of the two sliding members.
Figure 3B:
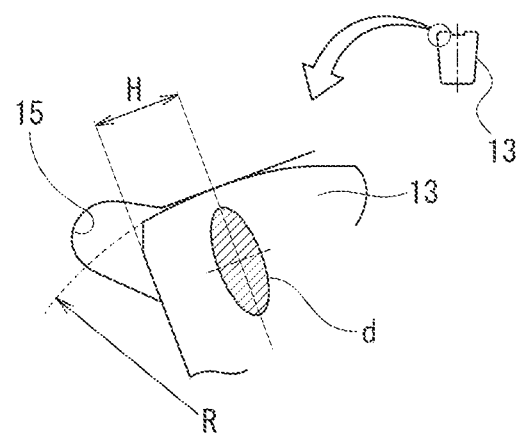

A tapered roller bearing is now illustrated in FIGS. 3A and 3B. As illustrated in the drawings, a tapered roller bearing 20 has a plurality of tapered rollers 13 freely rollably interposed between an outer ring 11 and an inner ring 12. On one side portion of the inner ring 12, a large flange portion 14 with which roller head portions 13t of the tapered rollers 13 come into contact is formed. At a boundary portion between the large flange portion 14 and a raceway surface, a clearance groove 15 is formed. Note that the signs R and H in the drawing denote radius of a roller head portion and height of a contact point between a facing surface 14t of the large flange portion and a roller head portion 13t, respectively.

An axial load acting on the tapered roller bearing 20 is mainly supported by the facing surface 14t of the large flange portion 14 and the roller head portions 13t of the tapered rollers 13. In addition, at a contact site between the facing surface 14t of the large flange portion 14 and a roller head portion 13t, a contact ellipse d that is calculated using Herz contact theory is formed. The contact ellipse d changes according to a geometric shape formed by the facing surface 14t of the large flange portion 14 and a roller head portion 13t and a flange load acting on the large flange portion 14.

Hence, when, for example, the product is the tapered roller bearing 20 and the present invention is applied to a roller head portion 13t and the facing surface 14t of the large flange portion 14 in the tapered roller bearing 20, roughness is respectively measured at positions at the contact point height H on the roller head portion 13t and the facing surface 14t of the large flange portion 14 as sites corresponding to the two sliding members 2 and 3.

Note that evaluation length preferably falls within the contact ellipse d. Regarding measurement direction, when roughness has distinct directionality, the measurement is performed in a direction perpendicular to the direction of a linear pattern in the directionality, and, when roughness has directionality in a plurality of directions or has no specific, distinct directionality, the roughness is measured in a direction that maximizes a roughness value. Calculation of parameters conforms to JIS B0671-2 ("ISO 13565-2" in ISO).

In step S8 in FIG. 1, when the roughness of the surfaces of the sliding surfaces having been processed to be produced into a desired product is a roughness value satisfying the target value of surface roughness required to be controlled as a product, which was obtained in the above-described step 6, and the ratio of valley portions within surface unevenness is equal to or less than a predetermined value, the component is classified as an acceptable product that has a friction coefficient equal to or less than a target friction coefficient [step 8, and transitioning to completion].

On the other hand, when the roughness of the surfaces of the sliding surfaces having been processed to be produced into a desired product does not satisfy the roughness satisfying the target value of surface roughness required to be controlled as a product, which was obtained in the above-described step 6, or the ratio of valley portions within the surface unevenness does not satisfy the predetermined value, the surfaces of the sliding surfaces are reprocessed [step 8, and transitioning to reprocessing] and the process returns to step S7.

Through this process, the friction design method and the surface roughness control method for a sliding member and the production method for a sliding mechanism of the present embodiment enable sliding friction generated between the mutual sliding surfaces of two sliding members lubricated with lubricant to be estimated with high precision.

Therefore, it is possible to, targeting, for example, facing surfaces of a roller head portion and a large flange portion of a tapered roller bearing, design friction between the roller head portion and the large flange portion with high precision and to control the surface roughness thereof to a value equal to or less than a surface roughness Rk or Rk+Rpk determined by the design.

Further, it is possible to, using sliding members that are classified as acceptable products by the surface roughness control method, produce, for example, a sliding mechanism of a tapered roller bearing (the facing surfaces of the roller head portions and the large flange portion). Because of this capability, in the case of a tapered roller bearing, improvement in process capability in roughness control of the roller head portions and the large flange portion of a tapered roller bearing and improvement in production efficiency thereof can be expected.

[On Oil Film Parameter λ]

Next, the friction design method and the friction control method for a sliding member and the production method for a sliding mechanism according to the above-described embodiment will be described below in more detail, using verification examples and the like.

First, the oil film parameter Λ will be described in detail. Conventionally, a film thickness ratio (oil film parameter) Λ that is calculated by the following formula (1) has been used as a parameter indicating a degree of interference between projections of roughness on contact portions of the mutual sliding surfaces of two sliding members under lubrication.

$$\Lambda = h/\sigma^* \quad (1)$$

In the above formula, h is oil film thickness of lubricant on the mutual sliding surfaces of the two sliding members, and σ* is composite roughness of the mutual sliding surfaces of the two sliding members. σ* is expressed by the following formula (2).

$$\sigma^* = \sqrt{(\sigma_1^2 + \sigma_2^2)} \quad (2)$$

Conventionally, as $\sigma_1$ and $\sigma_2$, root-mean-square roughness Rq that represents standard deviation of roughness of the mutual sliding surfaces of the sliding members or arithmetic mean roughness Ra (JIS B0601) has been used. Note that, in the following formulae, l is reference length and Z(x) is height at an arbitrary position x on a surface.

$$R_q = \sqrt{1/l \int_0^l Z^2(x)dx}, R_a = 1/l \int_0^l |Z(x)|dx \quad [\text{Math. 1}]$$

Problem in Conventional Friction Design and Control Method

The above-described oil film parameter Λ is known to have a significant correlation with friction because the oil film parameter Λ represents a degree of projection interference between sliding members.

However, an examination and verification by the inventors have revealed that there is a case where, when an oil film parameter Λ(Rq) or Λ(Ra) that is calculated using root-mean-square roughness Rq or arithmetic mean roughness Ra is employed as a parameter representing roughness of surfaces, sliding friction generated between the mutual sliding surfaces of two sliding members under lubrication cannot necessarily be classified significantly for a shape having a bias in the height distribution of roughness (a plateau surface having recessed grooves or holes on a smooth surface).

Figure 4A:
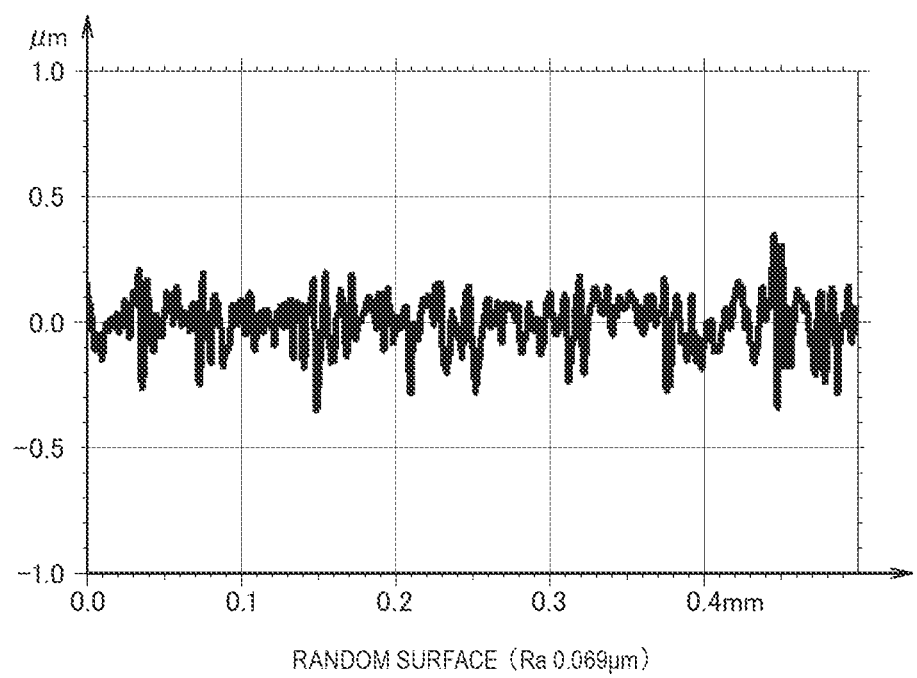
FIGS. 4A and 4B are graphs illustrative of examples of two surfaces that have substantially the same arithmetic mean roughness Ra (a random surface in FIG. 4A and a plateau surface in FIG. 4B)
Figure 4B:
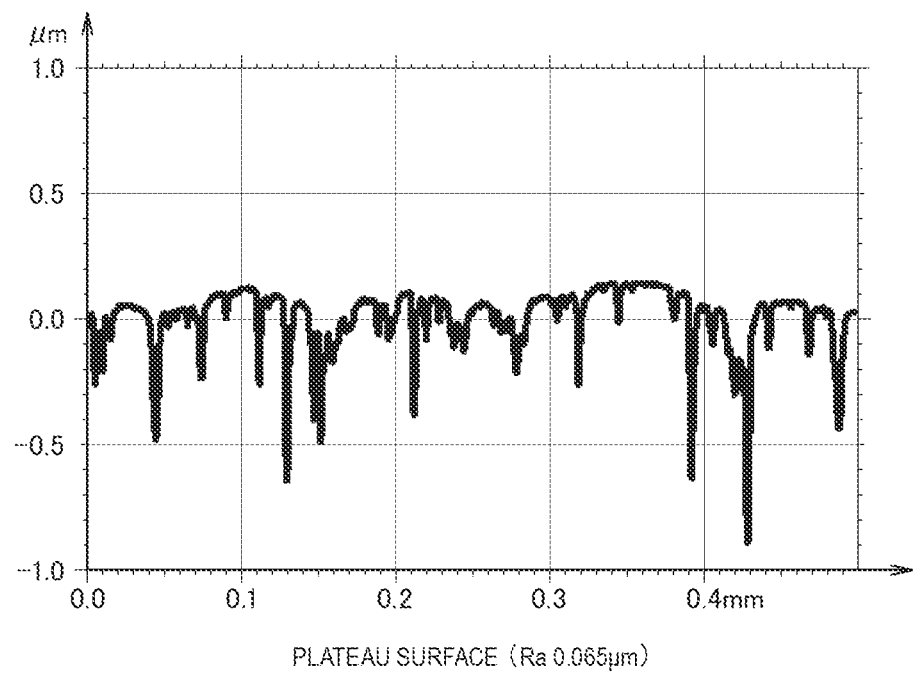

In FIGS. 4A and 4B, two examples of surfaces that have approximately the same arithmetic mean roughness Ra are illustrated, respectively. In this verification example, a friction test under the above-described predetermined operating condition A was performed on the two surfaces, illustrated in FIGS. 4A and 4B, that have approximately the same arithmetic mean roughness Ra, using the test device 10 illustrated in FIG. 2.

Figure 5:
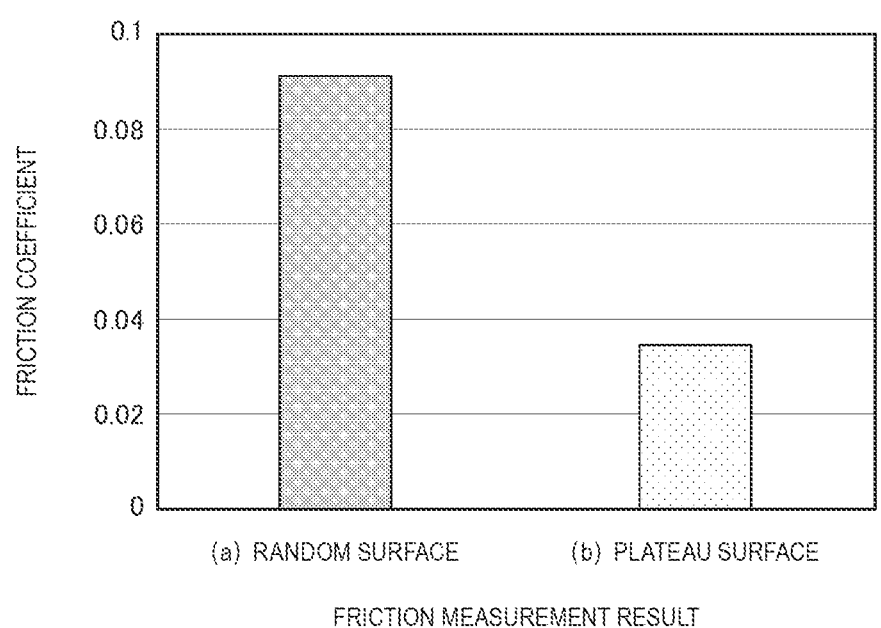
FIG. 5 is a graph illustrative of an example of a measurement result of sliding friction on the random surface and the plateau surface.

A result of measurement in the friction test using the test device 10 with respect to the two example surfaces in FIG. 4A and FIG. 4B revealed that, as illustrated in FIG. 5, a plateau surface (FIG. 4B) had a smaller sliding friction than a random surface (FIG. 4A). The test result indicates that the arithmetic mean roughness Ra does not enable sliding friction to be predicted and controlled.

To verify this indication, a friction test with respect to the sliding surface models shown in the above Table 1 was performed under the above-described predetermined operating condition B, using the test device 10, a relationship between the oil film parameter Λ and the friction coefficient μ was obtained, and a correlation between the oil film parameter Λ and the friction coefficient μ was verified. Roughness profiles of the surfaces used as sliding surface models in the friction test are illustrated in graphs in FIGS. 6A to 6G.

Histograms of the surfaces of the respective sliding surface models are also illustrated on the right side of the respective drawings in FIGS. 6A to 6G in order to facilitate understanding of unevenness distributions of the surfaces of the respective sliding surface models. The histograms of the surfaces of the respective sliding surface models illustrated in the drawings show that the surfaces 1 to 3 are random surfaces the unevenness distributions of which are close to normal distributions and the surfaces 4 to 6 are plateau surfaces the unevenness distributions of which are biased.

In addition, roughness parameters of the surfaces of the respective sliding surface models are shown in the above Table 1. Note that, since there exists variation of some degree in surface roughness depending on a location at which measurement is performed, average values that were obtained by performing measurement at a plurality of points on the surface of each sliding surface model are shown in Table 1.

In order to obtain a relationship between the oil film parameter Λ and the friction coefficient μ, an oil film thickness h at each experiment point is calculated using the Hamrock-Dowson film thickness formula (NPL 2), and an oil film parameter Λ at each test point is calculated from a surface roughness value shown in Table 1. Note that, the composite roughness σ* that is required to classify correlations, using the oil film parameter Λ was calculated from the square root $(\sigma_1^2 + \sigma_2^2)^{0.5}$ of the square sum of respective roughness values, and root-mean-square roughness Rq was used to represent the roughness a of a surface.

The Hamrock-Dowson film thickness formula of point contact EHL in NPL 2 is shown below.

$$H = h/Rx \quad (3)$$

In this equation, h, H, and Rx are oil film thickness, dimensionless film thickness, and effective radius of surfaces including the x-axis (movement direction), respectively. While either central film thickness or minimum film thickness can be used as the oil film thickness h, values in Table 1 were calculated using the central film thickness. The oil film thickness is calculated by calculating the following dimensionless film thickness H and substituting the calculated value into the formula (3).

In the case of central film thickness:

$$Hc = 2.69 U^{0.67} G^{0.53} W^{-0.067} \{1 - 0.61 \exp(-0.73k)\}$$

In the case of minimum film thickness:

$$H\min = 3.63 U^{0.68} G^{0.49} W^{-0.073} \{1 - \exp(-0.68k)\}$$

In the above formulae, W, G, U, and k are dimensionless representative quantities expressed by the following formulae.

$$W = w/(ERx^2)$$

$$G = \alpha E$$

$$U = (\eta_0 u)/(ERx)$$

$$k = a/b = 1.03(Ry/Rx)^{0.64}$$

In the above formulae, u is rolling velocity, $\eta_0$ is viscosity at atmospheric pressure, α is a pressure-viscosity coefficient, w is load, E is an effective elastic modulus, and a and b are radius in a movement direction x and radius in a direction y orthogonal to the movement direction x, respectively, of a contact ellipse.

Note that, although, in the verification example of the present embodiment, the oil film thickness was calculated using the Hamrock-Dowson film thickness formula for calculating an oil film thickness of point contact EHL, the calculation formula is not limited to the Hamrock-Dowson formula and an oil film thickness may be calculated using other formulae, such as Blok-Moes formula, Greenwood-Johnson formula, and Dowson-Higginson formula for calculating an oil film thickness of line contact EHL, or a value actually measured using optical interferometry, an electrostatic capacitance method, a contact electric resistance method (see, for example, NPL 6), an impedance method, or the like may be used.

Figure 7:
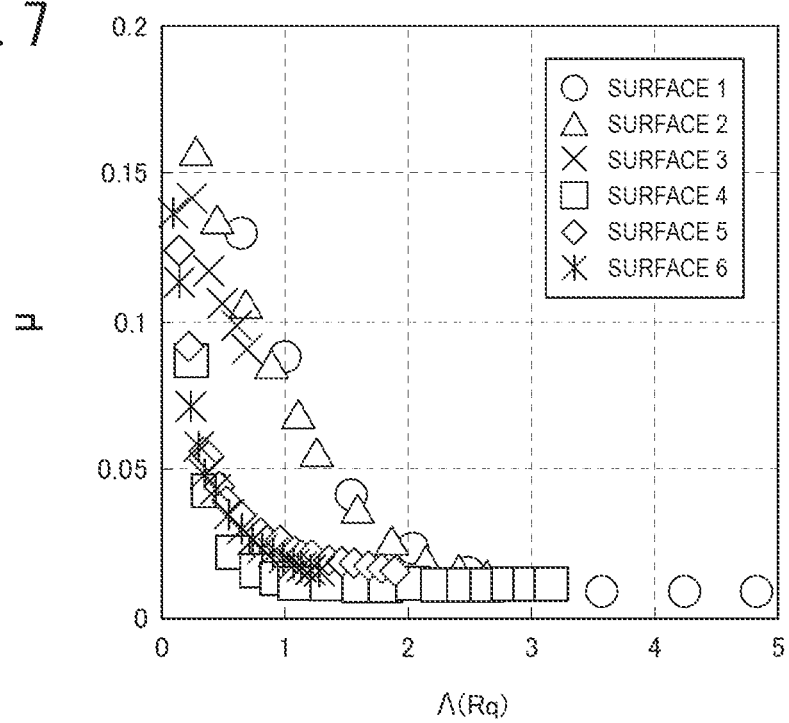
FIG. 7 is a graph illustrative of a relationship between an oil film parameter Λ(Rq) calculated using root-mean-square roughness Rq and a friction coefficient μ with respect to the sliding surface models illustrated in FIGS. 6A to 6G.

A graph illustrating a relationship between the oil film parameter Λ (Rq) calculated using root-mean-square roughness Rq and the friction coefficient μ, which is obtained by the above-described method, is illustrated in FIG. 7.

As described above, sliding friction generated between the mutual sliding surfaces of the two sliding members 2 and 3 lubricated with lubricant is known to have a correlation with a Λ-value (an oil film parameter or a film thickness ratio) obtained by dividing oil film thickness formed between the two surfaces by composite roughness calculated using the root-mean-square roughness Rq (or the arithmetic mean roughness Ra) of the sliding members (see the surfaces 1 to 3 represented by circles, triangles, and cross marks, respectively, in FIG. 7).

However, verification by the inventors of the claimed invention has revealed that, when the mutual sliding surfaces of two sliding members lubricated with lubricant are plateau surfaces the height distributions of roughness of which are, instead of normal distributions, biased distributions (see the surfaces 4 to 6 represented by squares, diamonds, and asterisks, respectively, in FIG. 7), the relationship between the oil film parameter Λ(Rq) and the friction coefficient μ is represented by a curve different from the relationships with respect to the surfaces 1 to 3, which have random unevenness distributions, as illustrated in FIG. 7 and the sliding friction generated between the mutual sliding surfaces of the two sliding members lubricated with lubricant cannot be collectively classified by the oil film parameter Λ(Rq) calculated from the root-mean-square roughness Rq.

In other words, as illustrated in the drawing, the surfaces 1 to 3 of the sliding surface models are random surfaces (surfaces the height distributions of roughness of which are close to normal distributions) and the surfaces 4 to 6 of the sliding surface models are plateau surfaces (surfaces that have no peak in the roughness and the unevenness distribution of which has a bias). As described above, it is revealed that sliding friction generated between surfaces that have substantially different height distributions of surface unevenness cannot be controlled by the oil film parameter Λ(Rq) calculated from the root-mean-square roughness Rq.

This is because the root-mean-square roughness Rq is a parameter calculated over the entire surface profile, as can be understood from the formula described afore and, when the surface includes a deep valley portion and a lot of valley portions, the value of Rq becomes large under the influence of such valley portions and the oil film parameter Λ (Rq), which is calculated from the value of Rq, is calculated to be small.

Hence, curves representing the plateau surfaces are plotted on the left side of curves representing the random surfaces (surfaces the height distributions of which are close to normal distributions) within the graph illustrated in FIG. 7. In other words, when a random surface and a plateau surface have the same root-mean-square roughness Rq, the plateau surface has smaller sliding friction generated between the mutual sliding surfaces of sliding members lubricated with lubricant than the random surface.

Figure 8A:
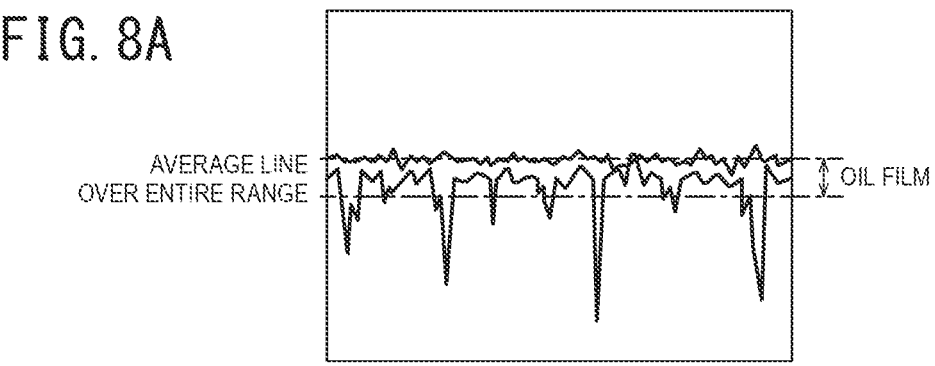
FIGS. 8A and 8B are graphs descriptive of conditions of oil film between mutual sliding surfaces of two sliding members lubricated with lubricant.
Figure 8B:
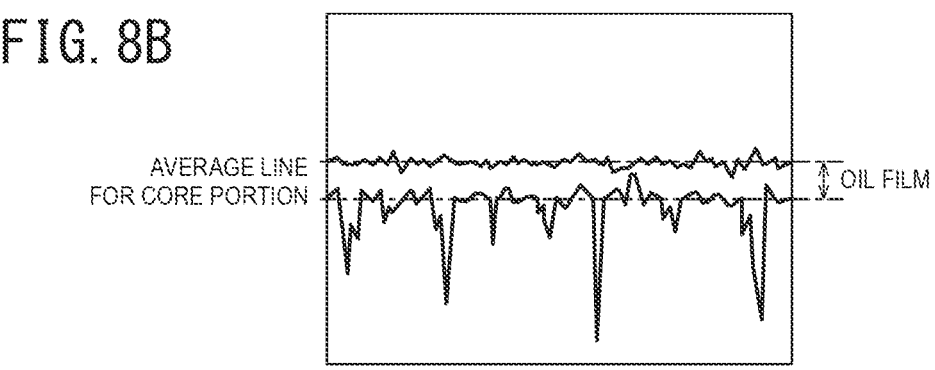

It is now assumed that, as illustrated in FIGS. 8A and 8B, oil film between the mutual sliding surfaces of the sliding members 2 and 3 lubricated with lubricant is formed based on, instead of an average value of roughness over the entire surface profile (FIG. 8A), an average line of roughness for a portion in which existence probability of the surface is high (FIG. 8B).

Parameters representing roughness in the "portion in which existence probability of the surface is high" include a level difference Rk of a core portion (JIS B0671). In the present invention, the roughness parameter Rk and a parameter Rpk that represents peak height of roughness are used as parameters representing surface roughness. The roughness parameters Rk and Rpk are calculated in accordance with the following procedure (*) with reference to diagrams in FIGS. 9 and 10.

(*)

Figure 9:
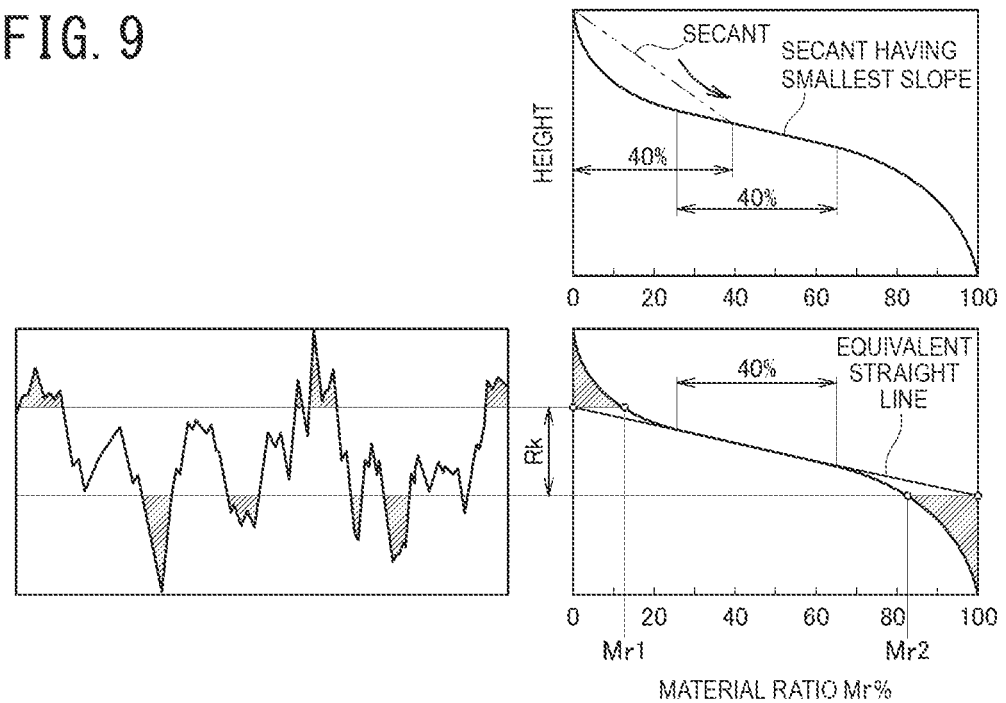
FIG. 9 is an explanatory diagram of a core portion level difference Rk and reduced peak height Rpk (JIS B0671)

An equivalent straight line is obtained from a central portion of a material ratio curve (which is S-shaped and has one inflection point), the central portion including 40% of the measurement points on a roughness curve. The "central portion" is located at a position at which a secant to the material ratio curve drawn with a difference ΔMr in a material ratio set at 40% has the smallest slope, as illustrated in FIG. 9.

The position is obtained by moving the secant satisfying ΔMr=40% along the material ratio curve from Mr=0%, as illustrated in the drawing. A secant satisfying ΔMr=40% that has the smallest slope serves as the central portion of the material ratio curve for calculating an equivalent straight line. When a plurality of portions having the smallest slope exist, a region that is found first serves as the "central portion" to be used. With respect to the "central portion", a straight line (equivalent straight line) that minimizes the square sum of deviations in the vertical axis direction is calculated.

Figure 10:
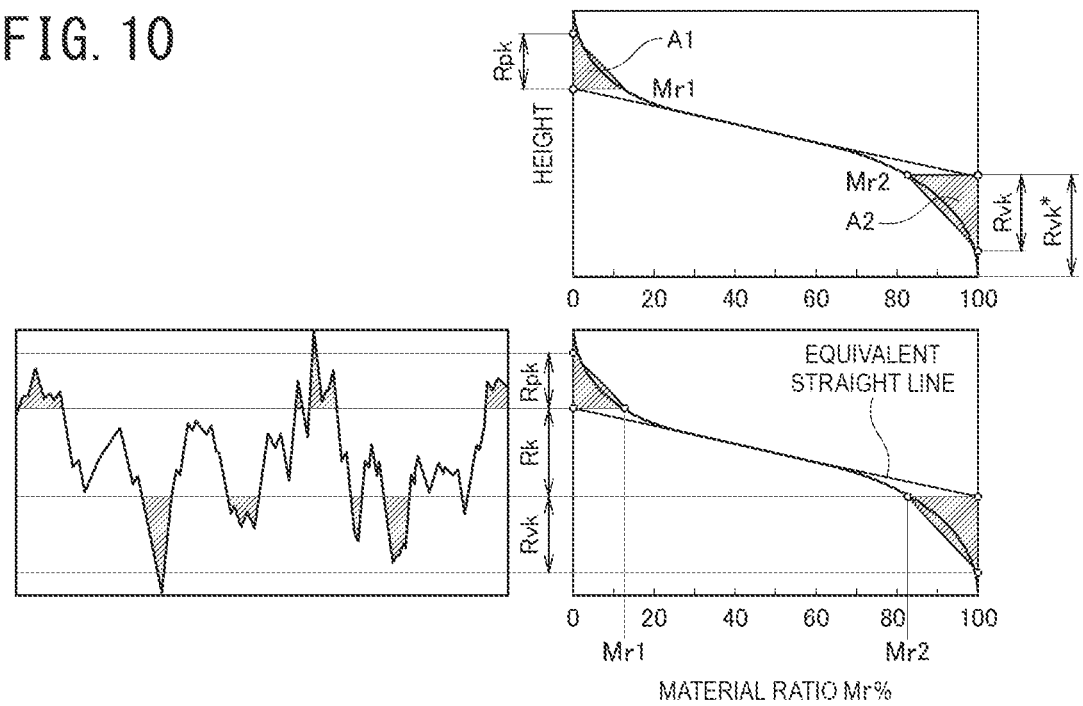
FIG. 10 is another explanatory diagram of the core portion level difference Rk and the reduced peak height Rpk (JIS B0671)

Areas of regions bounded by portions of the material ratio curve on the upper side and the lower side of a core portion represented by Rk are indicated by hatching in FIG. 10. The areas are equal to cross-sectional area of reduced peaks and cross-sectional area of reduced valleys that exist on the outer sides of the core portion of the roughness curve. The parameter Rpk is calculated as height of a right triangle having the same area as the cross-sectional area of the reduced peaks, and a parameter Rvk is calculated as height of a right triangle having the same area as the cross-sectional area of the reduced valleys (see FIG. 10). The base of a right triangle equivalent to cross-sectional area A1 of the reduced peaks is Mr1, and the base of a right triangle equivalent to cross-sectional area A2 of the reduced valleys is a difference between Mr2 and 100%.

(End of *)

In FIGS. 11A and 11B, a relationship between the level difference Rk of the core portion or the oil film parameter Λ(Rk), which is calculated using the level difference Rk of the core portion, as a roughness parameter and the friction coefficient μ (FIG. 11A) and a relationship between the oil film parameter Λ(Rk+Rpk) calculated using Rk+Rpk, which is the sum of the level difference Rk of the core portion and the reduced peak height Rpk, as a roughness parameter and the friction coefficient μ (FIG. 11B) are illustrated.

Verification examples illustrated in the drawings reveal that, when the oil film parameter Λ(Rk) or Λ(Rk+Rpk), which is calculated using Rk or Rk+Rpk, is used as a roughness parameter, the sliding friction (the friction coefficient μ) generated between the mutual sliding surfaces of the sliding members lubricated with lubricant can be significantly classified with respect to all the surfaces 1 to 6 in the sliding surface models illustrated in FIGS. 6A to 6G.

As described above, as a result of earnest examination, the inventors of the claimed invention have acquired knowledge that, by using, as illustrated in FIGS. 11A and 11B, the oil film parameter Λ(Rk) or Λ(Rk+Rpk), which is obtained by dividing oil film thickness by the composite roughness σ* calculated using the level difference Rk of a core portion (FIG. 11A) or Rk+Rpk (the sum of the level difference of the core portion and the reduced peak height (FIG. 11B)), as a parameter representing the roughness of mutual sliding surfaces of sliding members lubricated with lubricant, sliding friction generated between mutual sliding surfaces of two sliding members lubricated with lubricant can be significantly classified.

This result indirectly indicates that the above assumption that, on a surface having a shape, such as a plateau shape, the unevenness distribution of which has a bias, oil film is formed with, instead of an average line over the entire roughness as illustrated in FIG. 8A, an average line of a portion (a core portion of roughness) where the existence ratio of surface unevenness is large as illustrated in FIG. 8B used as a reference is not wrong.

In other words, since, when sliding friction is classified using the oil film parameter Λ(Rk) or Λ(Rk+Rpk), which is calculated using the level difference Rk of a core portion or Rk+Rpk, as a parameter representing surface roughness of the roller head portions and the large flange of a tapered roller bearing, the sliding friction is plotted on a single master curve regardless of whether or not the unevenness distribution of the surface shape has a bias, it becomes possible to estimate the sliding friction with high precision.

Figure 6:
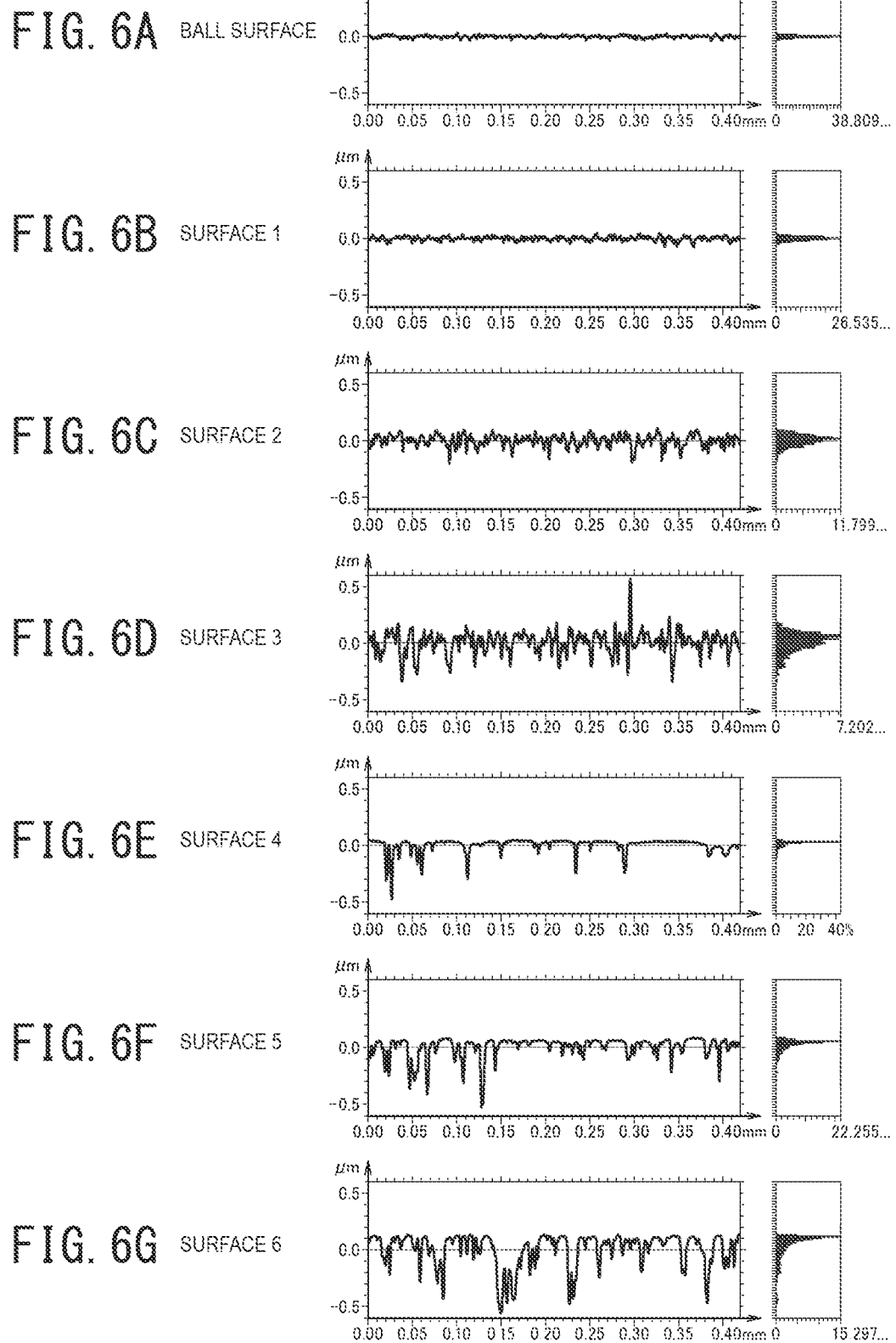
FIGS. 6A to 6B are diagrams illustrative of roughness profiles and histograms of surfaces in sliding surface models used in a friction test to be used in the friction design, control, and production method of the present embodiment.

Regarding which one of Rk and Rk+Rpk is used in the calculation of the oil film parameter Λ (that is, Λ(Rk) or Λ(Rk+Rpk)), the oil film parameter Λ of a plateau surface that evidently includes a lot of downwardly projecting portions and some plateau portions, such as the surfaces 4 to 6 illustrated in FIGS. 6E to 6G, may be calculated using either of Rk and Rk+Rpk.

Figure 12:
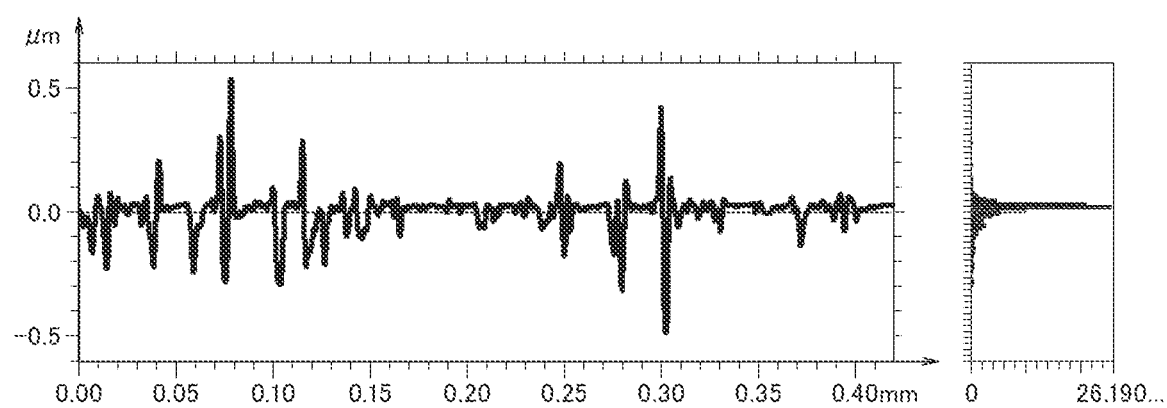
FIG. 12 is a diagram illustrative of an example of a profile and a histogram of a surface the sliding surface of which includes upwardly projecting portions and downwardly projecting portions.

However, the inventors has confirmed, through verification, that, in the case of a surface that has upwardly projecting portions and downwardly projecting portions as illustrated in an example in FIG. 12, calculation of the oil film parameter Λ(Rk+Rpk) using Rk+Rpk enables sliding friction to be classified more clearly.

In addition, the inventors has confirmed that the friction coefficient μ can also be classified significantly using an oil film parameter Λ calculated using, instead of line roughness like Rk and Rpk, a level difference Sk of a core portion and reduced peak height Spk in the sense of surface roughness (areal surface texture, defined in JIS B0681-2 or "ISO 25178-2" in ISO) (that is, Λ(Sk) or Λ(Sk+Spk)) as roughness of solid surfaces, and, as parameters representing the roughness of a solid surface, Sk and Sk+Spk may therefore be used.

Further, the inventors has also confirmed, through verification, that sliding friction generated between mutual sliding surfaces of sliding members lubricated with lubricant cannot also be classified with high precision by an oil film parameter Λ calculated using arithmetic mean roughness Sa or root-mean-square roughness Sq of surface roughness values (that is, Λ(Sa) or Λ(Sq)).

The fact that the friction coefficient μ can be classified using the oil film parameter Λ(Rk) or Λ(Rk+Rpk) calculated from the roughness parameter Rk and Rpk suggests that valley portions of roughness do not substantially influence friction.

Figure 13A:
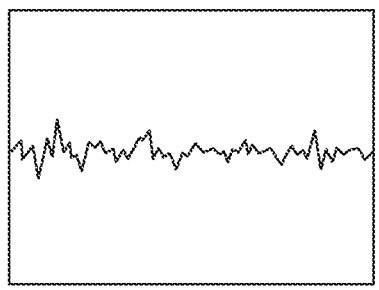
FIGS. 13A to 13C are diagrams illustrative of images of surfaces that, although represented by the same roughness parameter Rk, have different ratios of valley portions in roughness.
Figure 13B:
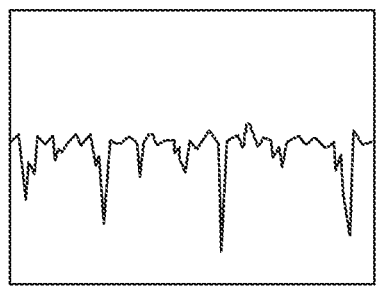
Figure 13C:
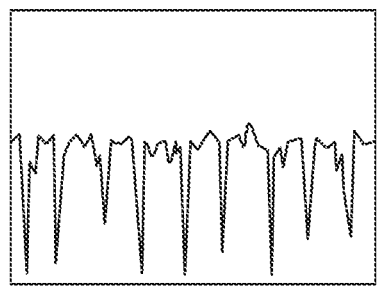

However, it is considered that, although valley portions do not substantially influence friction, it is not that whatever amount of valley portions are included in the roughness does not influence friction to any extent. For example, FIGS. 13A to 13C illustrate images of surfaces that, although represented by the same roughness parameter Rk, have different ratios of valley portions in roughness.

Thus, an experiment to verify how much amount of valley portions in roughness allows the friction coefficient μ to be significantly classified by the oil film parameter Λ(Rk) or Λ(Rk+Rpk) calculated using the roughness parameters Rk and Rpk was conducted. For this experiment, sliding surface models that have different ratios of valley portions in roughness and different depths of valley portions in roughness were prepared, and tests were performed under the following predetermined operating condition C using the friction test device 10 illustrated in FIG. 2.

The predetermined operating condition C is as follows: test oil, Durasyn 162 (5.5 cSt at 40° C.), Durasyn 166 (31 cSt at 40° C.), and Durasyn 170 (65 cSt at 40° C.); test temperature, 25° C. (room temperature); sliding ratio, 15%; rolling velocity, 0.01 m/s to 0.5 m/s; load, 9.8 N; and surface pressure, 0.5 GPa.

Roughness values of specimens 1 to 24 used in the verification test as sliding surface models are shown in Table 2. Surfaces 1 to 18 are disk specimens, and friction tests with a ball A shown in Table 3 were performed. Surfaces 19 to 24 are ball specimens, and friction tests with a disk B shown in Table 3 were performed.

In the table, values Δμ each of which is calculated, using a relationship between the oil film parameter Λ and the friction coefficient μ obtained by the test, to represent how much a sliding friction value obtained for one of the surfaces deviates with a surface having random roughness used as a reference when the oil film parameter has a predetermined value are also shown.

Figure 14:
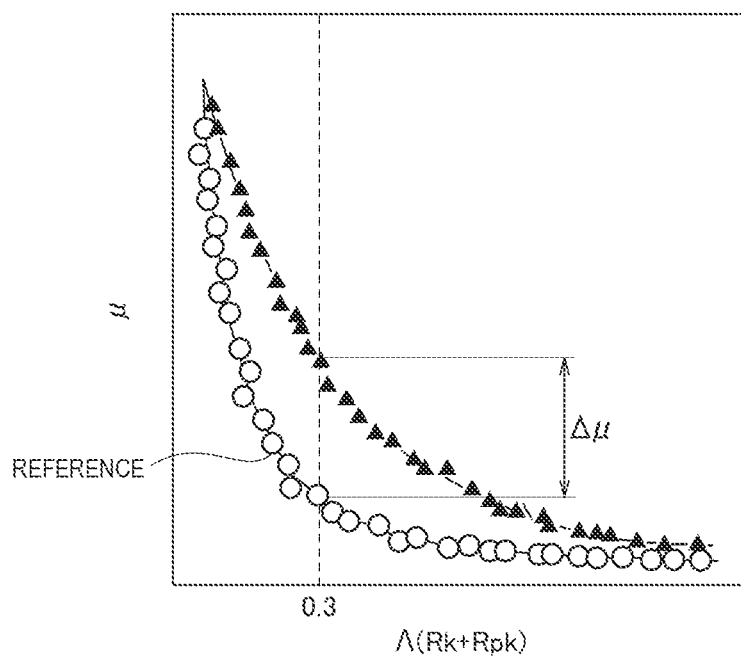
FIG. 14 is a schematic diagram for a description of a calculation method of Δμ.

In this experiment, Λ(Rk+Rpk) calculated from Rk+Rpk was used as the oil film parameter, and a value Δμ when the value of Λ(Rk+Rpk) was 0.3 was calculated. Note that Λ(Rk) may be used as the oil film parameter and the predetermined value may be a value other than 0.3 and can be determined arbitrarily. In addition, as a surface that has random roughness and serves as a reference, the surface 1 and the surface 19 were used for the surfaces 1 to 18 and the surfaces 19 to 24, respectively. A schematic diagram for describing calculation of Δμ is illustrated in FIG. 14.

TABLE 2

|  |  |  | Rq, um | Rk, um | Rpk, um | Rvk, um | 100-Mr2, % | 100-Rmr, % | Δμ |
|---|---|---|---|---|---|---|---|---|---|
| Disk | Random | Surface 1 | 0.003 | 0.008 | 0.005 | 0.003 | 9.7 | 1.0 | — |
| (Steel) |  | Surface 2 | 0.049 | 0.110 | 0.036 | 0.072 | 14.4 | 4.2 | 0.022 |
|  |  | Surface 3 | 0.034 | 0.070 | 0.012 | 0.056 | 17.8 | 6.8 | 0.002 |

TABLE 2-continued

| | | | Rq, um | Rk, um | Rpk, um | Rvk, um | 100-Mr2, % | 100-Rmr, % | Δμ |
|---|---|---|---|---|---|---|---|---|---|
| | | Surface 4 | 0.020 | 0.046 | 0.013 | 0.034 | 13.2 | 4.4 | 0.003 |
| | | Surface 5 | 0.036 | 0.083 | 0.018 | 0.060 | 14.1 | 4.9 | 0.007 |
| | Plateau | Surface 6 | 0.051 | 0.068 | 0.009 | 0.116 | 24.7 | 15.5 | 0.001 |
| | | Surface 7 | 0.065 | 0.107 | 0.020 | 0.149 | 19.8 | 10.8 | 0.000 |
| | | Surface 8 | 0.304 | 0.130 | 0.010 | 0.935 | 40.8 | 35.8 | 0.043 |
| | | Surface 9 | 0.054 | 0.084 | 0.012 | 0.111 | 22.0 | 11.5 | 0.015 |
| | | Surface 10 | 0.044 | 0.044 | 0.028 | 0.100 | 26.3 | 18.0 | 0.008 |
| | | Surface 11 | 0.057 | 0.040 | 0.087 | 0.137 | 28.1 | 21.2 | 0.025 |
| | | Surface 12 | 0.347 | 0.142 | 0.015 | 1.056 | 38.0 | 32.0 | 0.059 |
| | | Surface 13 | 0.145 | 0.113 | 0.011 | 0.368 | 35.6 | 27.6 | 0.041 |
| | | Surface 14 | 0.082 | 0.147 | 0.035 | 0.176 | 17.2 | 8.7 | 0.015 |
| | | Surface 15 | 0.290 | 0.048 | 0.006 | 0.819 | 38.8 | 33.6 | 0.055 |
| | | Surface 16 | 0.116 | 0.019 | 0.005 | 0.246 | 30.6 | 24.3 | 0.010 |
| | | Surface 17 | 0.098 | 0.060 | 0.013 | 0.241 | 33.9 | 26.9 | 0.023 |
| | | Surface 18 | 0.058 | 0.024 | 0.005 | 0.136 | 31.8 | 24.7 | 0.018 |
| Ball (Steel) | Random | Surface 19 | 0.006 | 0.013 | 0.004 | 0.011 | 14.8 | 2.3 | — |
| | Plateau | Surface 20 | 0.064 | 0.019 | 0.006 | 0.229 | 16.2 | 9.8 | 0.002 |
| | | Surface 21 | 0.140 | 0.036 | 0.007 | 0.432 | 39.8 | 37.2 | 0.047 |
| | | Surface 22 | 0.321 | 0.019 | 0.011 | 0.907 | 21.4 | 13.4 | 0.010 |
| | | Surface 23 | 0.323 | 0.021 | 0.012 | 1.139 | 22.3 | 17.8 | 0.015 |
| | | Surface 24 | 0.053 | 0.021 | 0.007 | 0.322 | 15.8 | 11.1 | 0.017 |

TABLE 3

| | Rq, um | Rk, um | Rpk, um | Rvk, um | 100-Mr2, % | 100-Rmr, % |
|---|---|---|---|---|---|---|
| Ball A (Steel) | 0.011 | 0.025 | 0.008 | 0.027 | 12.4 | 4.4 |
| Disk B (Glass) | 0.0004 | 0.0009 | 0.0004 | 0.0010 | 12.9 | 3.3 |

Figure 15A:
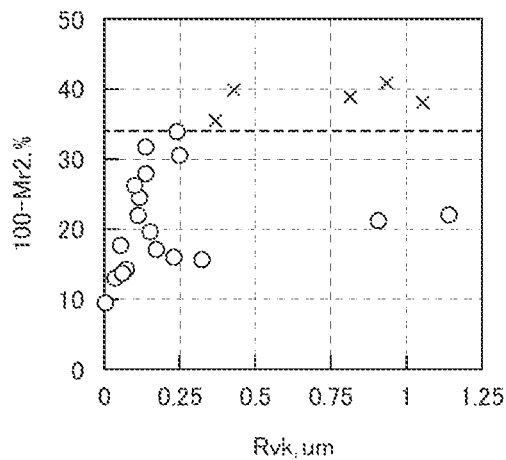
FIGS. 15A and 15B are diagrams illustrative of a relationship between 100−Mr2 representing a ratio Svr of valley portions within surface unevenness and reduced valley depth Rvk (FIG. 15A) and a diagram illustrative of a relationship between 100−Rmr representing the ratio Svr of the valley portions within the surface unevenness and the reduced valley depth Rvk (FIG. 15B)

In FIG. 15A, a diagram the X-axis and Y-axis of which represent reduced valley depth Rvk representing depth of valley portions of surface unevenness and 100−Mr2 representing a ratio Svr of valley portions within surface unevenness by use of the material ratio Mr2 of a core portion, respectively, is illustrated. Note that, in the drawing, with the surface 1 or the surface 19 that has random roughness used as a reference, a surface the deviation amount Δμ of which from the reference is less than 0.03 and a surface the deviation amount Δμ of which from the reference is equal to or greater than 0.03 are represented by a circle and a cross mark, respectively.

As a result, since, as illustrated in the drawing, the surface 17 among the surfaces 1 to 24 had a maximum value of 100−Mr2 of 33.9% while satisfying Δμ<0.03, it was revealed that a deviation amount Δμ from the reference becomes greater than 0.03 when the value of 100−Mr2 is greater than 33.9% (a position indicated by a dashed line in the drawing). In other words, it was revealed that, when 100−Mr2>33.9% holds, a probability that the friction coefficient μ cannot be classified with high precision even when the oil film parameter Λ(Rk+Rpk) is obtained using Rk+Rpk increases.

It is considered that the primary cause for this phenomenon is that increase in the ratio of valley portions in roughness caused the oil film having been formed with the average line of the core portion used as a reference to shift the reference line toward the valley portions, influenced by the increase of valley portions in roughness. In addition, the fact that increase in the ratio of valley portions in roughness causes the inclination of the secant in calculation of Rk to increase and Rk to be calculated to be large is considered to be another cause for the phenomenon.

In other words, when a target value for the surface roughness of a sliding surface required to be controlled as a product is set based on a correlation between a friction coefficient in a sliding surface model corresponding to the mutual sliding surfaces of the sliding members 2 and 3 lubricated with lubricant and an oil film parameter Λ(Rk) or Λ(Rk+Rpk) calculated using a core portion level difference Rk or the sum of the core portion level difference Rk and reduced peak height Rpk as a parameter representing surface roughness in the sliding surface model, a more preferable surface for significantly classifying the oil film parameter Λ(Rk) or Λ(Rk+Rpk), using Rk and Rpk is a surface that satisfies 100−Mr2≤33.9%.

As an alternative method for representing the ratio Svr of valley portions within surface unevenness, a material ratio Rmr(c) of a roughness curve or a relative material ratio Rmr (JIS B0601 and ISO4287) may be used in place of Mr2.

Figure 21A:
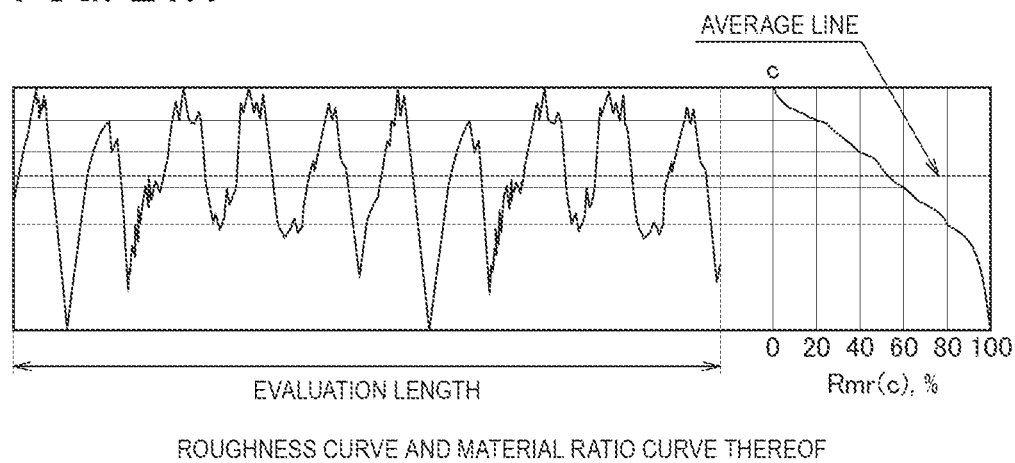
FIG. 21A is a graph illustrative of a roughness curve and a material ratio curve thereof and FIG. 21B is a graph illustrative of different section levels on a material ratio curve of roughness (FIG. 21B).
Figure 21B:
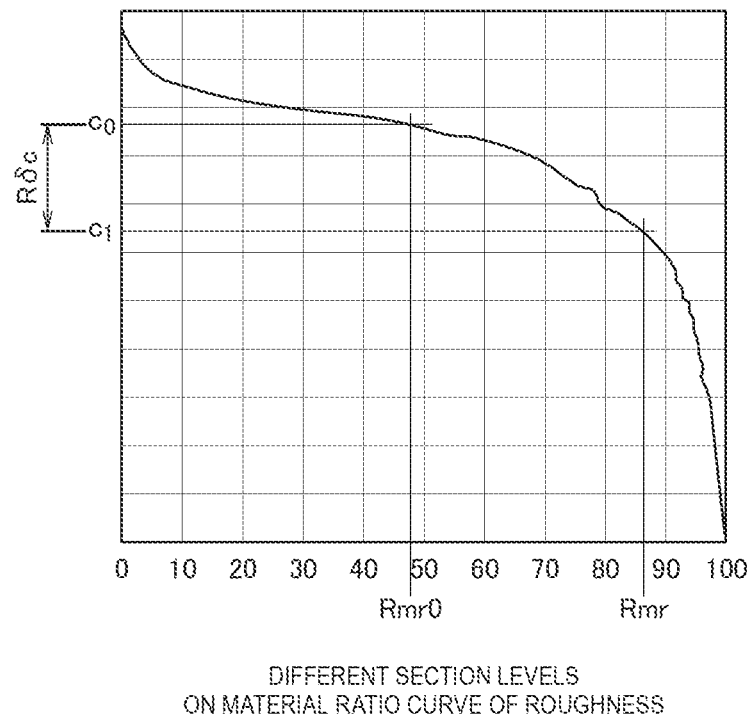

The relative material ratio Rmr is a material ratio that is determined based on a section level c0 serving as a reference and a section level difference Rδc of a roughness curve (see FIGS. 21A and 21B).

Relative material ratio Rmr=material ratio Rmr(c1) of a roughness curve, where c1=c0−Rδc and c0=c(Rmr0).

An example in which Rmr is calculated by assigning Mr2 and 0.39×Rk to Rmr0 and Rδc, respectively, is described herein.

When the ratio of valley portions within surface unevenness is denoted by 100−Mr2, a result that valley portions occupy approximately 10% of the surface unevenness even in the case of random roughness is obtained. Hence, in the case of a surface in which large valley portions exist among small random roughness (such as surfaces illustrated in FIGS. 16 and 17), 100−Mr2 unexpectedly exhibits a larger value than a ratio of valley portions that is visually recognized. Note that, in FIG. 16, portions surrounded by dashed lines are small roughness and portions indicated by arrows are large valleys.

Figure 17:
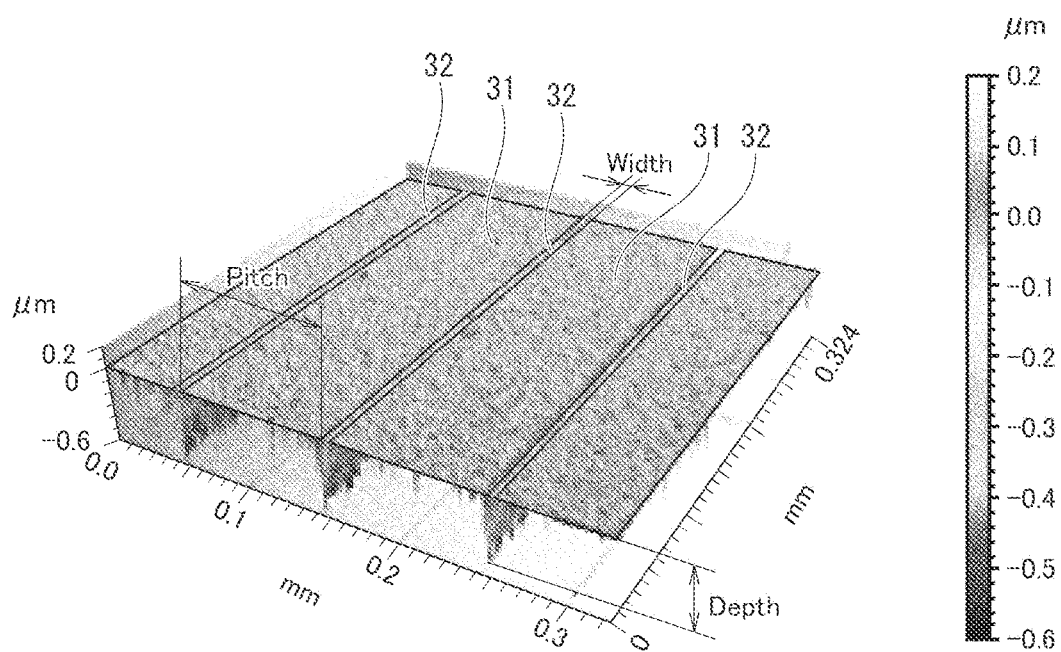
FIG. 17 is a diagram descriptive of an example of a three-dimensional shape of a surface of a specimen used in a test according to the one embodiment of the present invention.

For example, in the case of FIG. 17, although the value of 100−Mr2 is 16.2% (the surface 20 in Table 2), an actual ratio of valley portions is 9.4% (the area ratio of a specimen A in Table 4). This is because 100−Mr2 inevitably includes a ratio of valley portions in small random roughness forming plateau portions in the calculation process.

On the other hand, in the case of Rmr calculated by assigning Mr2 and 0.39×Rk to Rmr0 and Rδc, respectively, it is possible to calculate a value close to an actual ratio of valley portions without influenced by the small random roughness forming the plateau portion.

In this example, 0.39×Rk is a value equivalent to Rvk in the case where surface unevenness is completely random, and assigning 0.39×Rk to Rδc enables an area ratio of only large valley portions with influence of valley portions in the small random roughness, which forms the plateau portion, eliminated to be calculated.

For example, in the case of the surface in FIG. 17, it is revealed that the value of 100−Rmr is 9.8% (the surface 20 in Table 2), which is close to an actual ratio of valley portions. Since, in the case where valley portions within surface unevenness is represented by this method, the value of 100−Rmr that is maximum while satisfying Δμ<0.03 is 26.9% for the surface 17 (FIG. 15B), a probability that the friction coefficient μ cannot be classified with high precision even when the oil film parameter Λ(Rk+Rpk) is obtained using Rk+Rpk increases when 100−Rmr>26.9% holds.

Figure 15B:
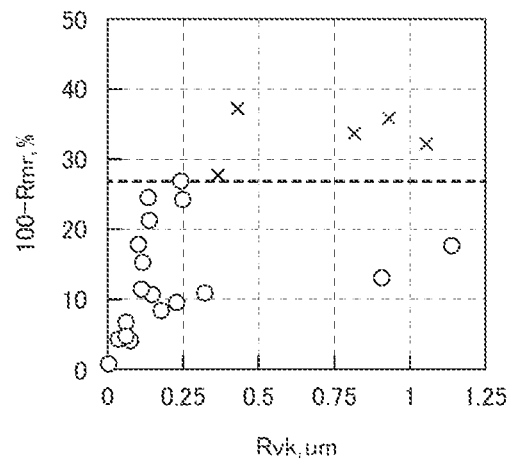

FIG. 15B illustrates a relationship between 100-Rmr representing the ratio Svr of valley portions within surface unevenness and the reduced valley depth Rvk. Note that, in the drawing, with the surface 1 that has random roughness used as a reference, a surface the deviation amount Δμ of which from the reference is less than 0.03 and a surface the deviation amount Δμ of which from the reference is equal to or greater than 0.03 are represented by a circle and a cross mark, respectively.

Note also that, as a value assigned to Rδc, 0.88×Rk (a value equivalent to actual reduced valley depth Rvk* in the case where the surface unevenness is completely random, see FIG. 10) may be used in place of 0.39×Rk. In this case, it is possible to completely eliminate a ratio of valley portions in the small random roughness forming the plateau portion.

As described above, when the friction design method and the surface roughness control method for a sliding member and the production method for a sliding mechanism of the present embodiment described above are used, it is preferable to also determine whether or not a target surface satisfies the condition described above (100−Mr2≤33.9% or 100−Rmr≤26.9%), as needed basis.

Note that, when the ratio Svr of valley portions within surface unevenness is calculated, an areal material ratio Smr2 and a relative areal material ratio Smr of a core portion and a core portion level difference Sk, which are three-dimensional roughness parameters (JIS B0681-2 or "ISO 25178-2" in ISO), may be used instead of Mr2, Rmr, and Rk, which are two-dimensional roughness parameters.

Although the relative areal material ratio Smr is a parameter that is not defined in JIS and ISO, the relative areal material ratio Smr can be calculated using the following formula in accordance with a procedure similar to that of Rmr.

Relative areal material ratio Smr=areal material ratio Smr(c1) of a surface, where c1=c0−Rδc and c0=c(Smr0), and Smr is calculated through assignments such as Smr0=Smr2 and Rδc=0.39×Rk or 0.88×Rk.

In the above-described embodiment, when the friction design method and the roughness control method using the friction design method are applied to the roller head portions and the large flange portion of a tapered roller bearing, whether or not the roller head portions and the large flange portion are surfaces that satisfy a condition based on the above-described knowledge is also determined.

Further, in the production method of the above-described embodiment, a tapered roller bearing is produced by targeting the mutual facing surfaces of the roller head portions and the large flange portion of the tapered roller bearing as the mutual sliding surfaces of the sliding members 2 and 3 that are set to be controlled as a product and using roller head portions and a large flange portion the surface roughness of the mutual facing surfaces of which are controlled to a predetermined surface roughness Rk or Rk+Rpk or less.

Further, when a tapered roller bearing is produced, it is preferable to use Rk+Rpk as a parameter for controlling the surface roughness of the sliding surfaces of the roller head portions and to use Rk as a parameter for controlling the surface roughness of the sliding surface of the large flange portion.

The reason for the preference is that, since, when compared between the roller head portion and the large flange portion, the roller head portion has a higher hardness than the large flange portion and the large flange portion is relatively softer than the roller head portion, the large flange portion wears earlier than the roller head portion due to rotational drive and reduced peaks rapidly disappear.

As such, applying Rk, which is comparatively easy to control, to the sliding surface of the large flange portion and applying Rk+Rpk, which is comparatively difficult to control, to the sliding surfaces of the roller head portions as parameters to be designed and controlled enable friction design, control, and production with higher efficiency to be achieved.

As described in the foregoing, the friction design method and the surface roughness control method and the production method for a sliding mechanism according to one aspect of the present invention enable sliding friction generated between mutual sliding surfaces of sliding members lubricated with lubricant to be estimated with high precision. Thus, the friction design method and the surface roughness control method and the production method for a sliding mechanism can be used for friction design of a sliding member, roughness control of a sliding member, and production of a sliding member in application to, for example, a constituent element of a rolling bearing, a constituent element of a sliding bearing, or a constituent element of a ball screw.

Meanwhile, as described afore, in the case of a surface, such as a plateau shape, the unevenness distribution of which has a bias, friction cannot be classified with Rq or Ra, which indicates a degree of roughness of a surface in a general way. In other words, in the case of such a surface, torque of a bearing cannot be estimated with high precision.

On the other hand, because of use of Rk or Rk+Rpk as a roughness parameter, the friction design method, the surface roughness control method, and the production method of the present invention enable sliding friction generated between mutual sliding surfaces of sliding members to be clearly classified as a function of an oil film parameter. In other words, use of the respective methods according to the present invention enables, for example, sliding friction generated between the roller head portions and the large flange portion of a tapered roller bearing to be estimated with high precision.

Further, the friction design method, the surface roughness control method, and the production method according to the one aspect of the present invention enable productivity of a tapered roller bearing to be improved without reducing bearing performance. In other words, to lower friction in a system that is in boundary or mixed lubrication, reducing roughness of a solid surface and bringing the system into hydrodynamic lubrication, in which solids do not come into contact with each other, enable the friction to be lowered. As such, it is necessary to reduce surface roughness by means of processing, such as grinding and polishing.

However, when the surface is processed in such a way as to reduce surface roughness, although projecting portions of the roughness can be removed, it is difficult to completely eliminate valley portions of the roughness. In such a case, since Rq and Ra, which are conventionally used roughness parameters representing surface roughness, are an arithmetic average and a root mean square over the entire roughness, the values of Rq and Ra become large, influenced by valley portions.

Figure 16:
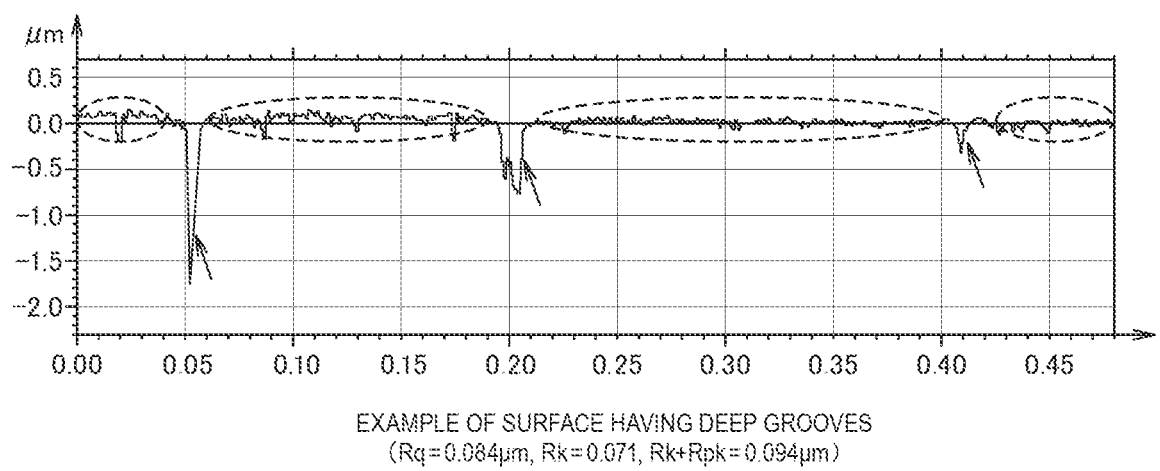
FIG. 16 is a graph illustrative of an example of a shape that has a bias in a height distribution of roughness (a surface containing deep grooves among small roughness)

For example, when a roughness standard to achieve a target friction level is Rq≤0.05 μm, a surface that has a profile as illustrated in FIG. 16 does not satisfy the standard because Rq=0.084 μm and is therefore classified as a defective surface. However, since Rk=0.071 μm and Rk+Rpk=0.094 μm with respect to this surface and the surface is therefore a surface having intermediate values of Rk and Rk+Rpk between those of the surface 1 in Table 1 and those of the surface 2 in Table 1, the surface is in practice a surface having a random unevenness distribution, is supposed to be equivalent to a surface having a roughness Rq of 0.02 to 0.05 μm, is considered to be a surface exhibiting a smaller friction than the target friction, and is a surface to be classified as a non-defective product.

In other words, controlling roughness of a solid surface with Rk or Rk+Rpk enables a product that is essentially not a defective product to be salvaged, and an improvement in process capability and production capability can therefore be expected. In addition, in the case of a conventional control method using Rq or Ra, it is required to shape the entire surface into a smooth surface, which may cause reduction in productivity and high cost.

On the other hand, in the case of control using Rk or Rk+Rpk, it is only required to smooth roughness of only a portion having a correlation with friction, that is, a portion actually supporting a load. Therefore, reduction in cycle time (improvement in productivity) due to reduction in machining allowance and cost reduction effect due to extension of grindstone life can be expected.

Hereinafter, a test according to one embodiment of the present invention, a result and consideration thereof will be described. In particular, the following consideration relates to a method for controlling surface roughness of two solids that are lubricated with lubricant and slide with each other under rolling-sliding conditions.

Attempts to improve tribological characteristics by forming a characteristic shape on a surface have been widely performed, and a lot of reports on effects of a variety of surfaces under pure sliding conditions and mechanisms thereof have been made (see, for example, NPL 3). On the other hand, under rolling-sliding conditions, although some reports of investigation on a relationship between oil film thickness and a surface shape have been made (see, for example, NPLs 4 and 5), few reports of investigation on a relationship between friction and a surface shape have been made. Thus, in the following consideration, a roughness control method that enables a control condition for desired surface roughness to be satisfied under rolling-sliding conditions when grooves exist on the surface will be considered.

[Experiment Method]

A test in the present example was performed using a rotary ball-on-disk tester illustrated in FIG. 2. The rotary ball-on-disk tester has a mechanism that is capable of independently driving the ball and the disk and enables the test to be performed using an arbitrary sliding ratio. Friction force was measured by a torque meter, which was attached to the shaft of the disk. The rotary ball-on-disk tester has a mechanism that, by using BK7 glass for the disk specimen and coating the surface of the disk specimen with a semi-transmissive film made of Cr and further coating the surface of the semi-transmissive film with a SiO2 film, is capable of measuring oil film thickness, using optical interferometry (see, for example, NPL 4).

Note that the surface roughness Rq of the disk is 0.4 nm. For ball specimens, bearing steel balls (material: SUJ2) that have a roughness Rq of 5.9 nm and a diameter of 1 inch were used, and five types of groove shapes shown in Table 4 were formed in parallel with the sliding direction by a picosecond laser machine.

In FIG. 17, an example of the three-dimensional shape of formed parallel grooves (reference signs 32 illustrated in the drawing indicate groove portions, note that plateau portions 31 are formed between the groove portions 32) is illustrated. Test conditions are shown in Table 5. Although, in the present embodiment, description is made by employing parallel grooves as the grooves (groove portions), as illustrated in FIG. 17, the present invention is also applicable to grooves other than parallel grooves.

TABLE 4

Table 1 Shape of parallel grooves

| Specimen | Width, um | Depth, um | Pitch, um | Area ratio, % |
|---|---|---|---|---|
| A | 9.4 | 0.47 | 100 | 9.4 |
| B | 9.2 | 0.46 | 50 | 18 |
| C | 8.8 | 0.48 | 20 | 44 |
| D | 9.1 | 0.35 | 50 | 18 |
| E | 8.6 | 1.42 | 50 | 17 |

TABLE 5

Table 2 Experimental conditions

| | |
|---|---|
| Temperature, ° C. | 25 |
| Entrainment speed, m/s | 0.02 to 0.1 |
| Slide-to-roll ratio, % | 15 (disk > ball) |
| Maximum contact pressure, GPa | 0.34 |
| Hertzian contact radius, mm | 0.12 |
| Lubricant | PAO |
| Kinematic viscosity at 40° C., mm$^2$/s | 5.54 to 396 |

[Experimental Result and Consideration]

Figure 18:
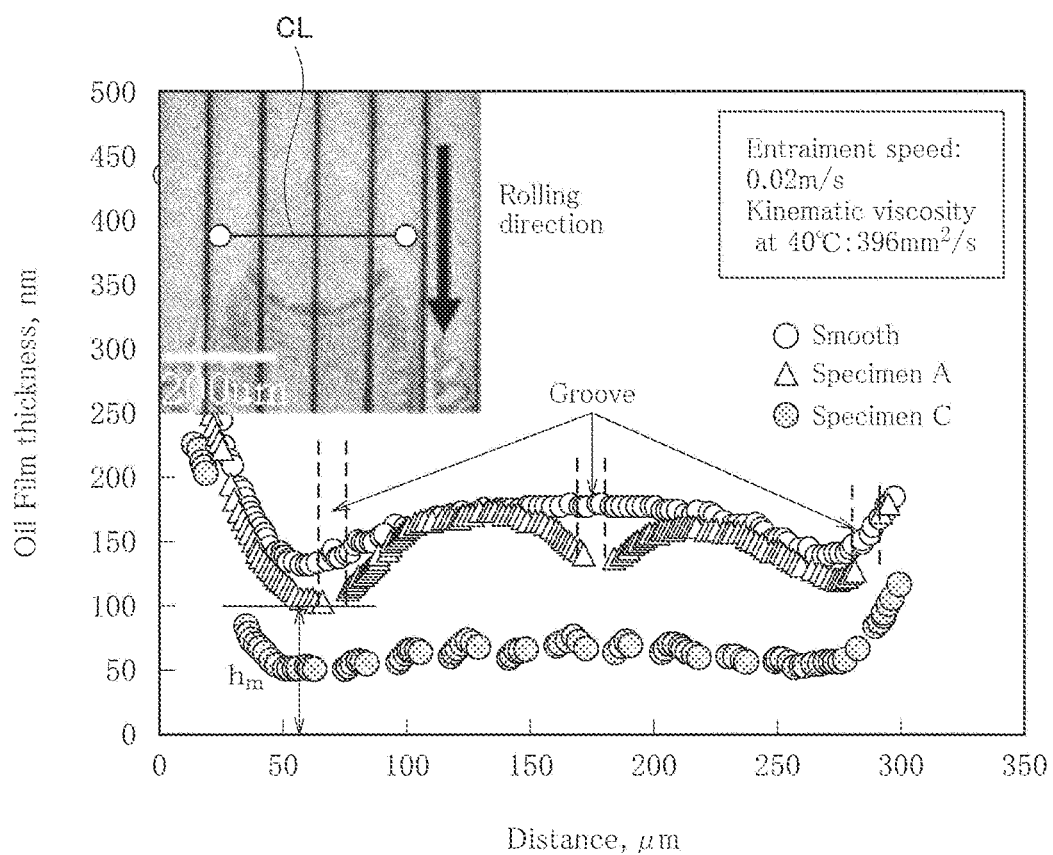
FIG. 18 is a diagram illustrative of examples of an interference image and central oil film cross-sectional shapes that are measured using optical interferometry.

In FIG. 18, an interference image that was measured using optical interferometry when the specimen A is used and examples of central oil film cross-sectional shapes taken along a line CL (of the smooth surface, the specimen A, and the specimen C) are illustrated. Note that oil film was unable be measured inside the grooves because light was not sufficiently reflected. The oil film cross-sectional shapes reveal that the oil film thickness decreases locally at groove edge portions and the oil film thickness decreases over the entire range depending on groove area ratios. Note that oil film thickness hm, which will be described later, is a minimum value of the oil film thickness of a central oil film cross-section illustrated in FIG. 18.

Figure 19:
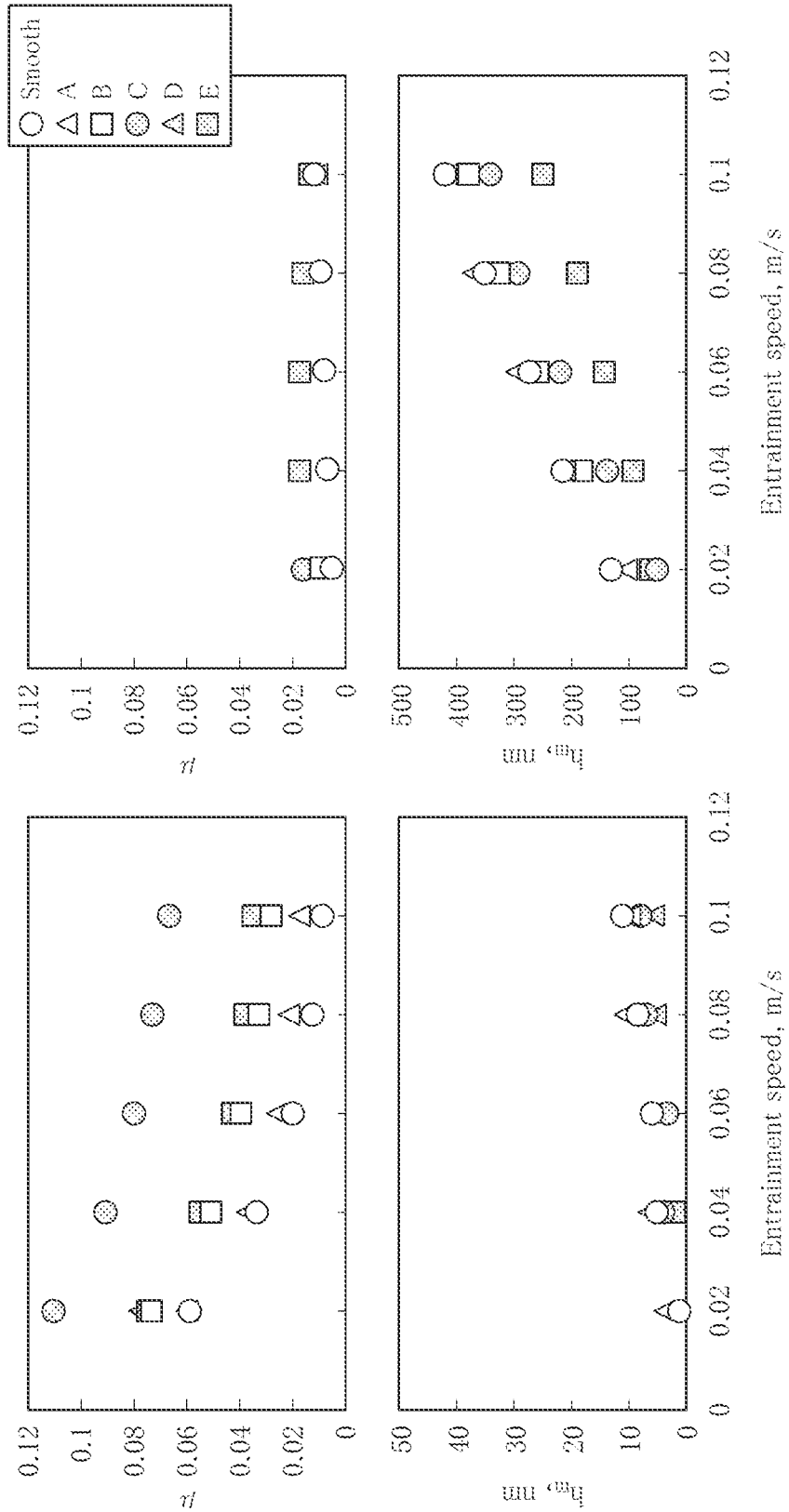
FIG. 19 is diagrams illustrative of friction coefficients and oil film thicknesses at each speed.

In FIG. 19, friction coefficients and oil film thicknesses at each speed are illustrated. Parts (a) and (b) are results in the case of low-viscosity oil with a kinematic viscosity of 5.54 mm$^2$/s and in the case of high-viscosity oil with a kinematic viscosity of 396 mm$^2$/s, respectively.

As illustrated in the drawing, in the case (a) of using low-viscosity oil, the friction coefficient increases in association with reduction in the speed with respect to all the specimens, which reveals that the lubrication is in a mixed lubrication region. It is revealed that, in this lubrication region, although there is no large difference in oil film thickness, the friction coefficient becomes higher as the area ratio of grooves increases, and groove depth hardly influences the friction coefficient.

On the other hand, in the case of hydrodynamic lubrication using the high-viscosity oil, change in the oil film thickness is more prominent than change in the friction. When focusing on the specimen E, which has the deepest groove depth, the oil film thickness is approximately 50% of that in the case of the smooth surface and the friction coefficient is larger than that in the case of the smooth surface. Differing from the result for the low-viscosity oil, this result indicates that the groove depth has a larger influence than the groove area ratio.

Figure 20:
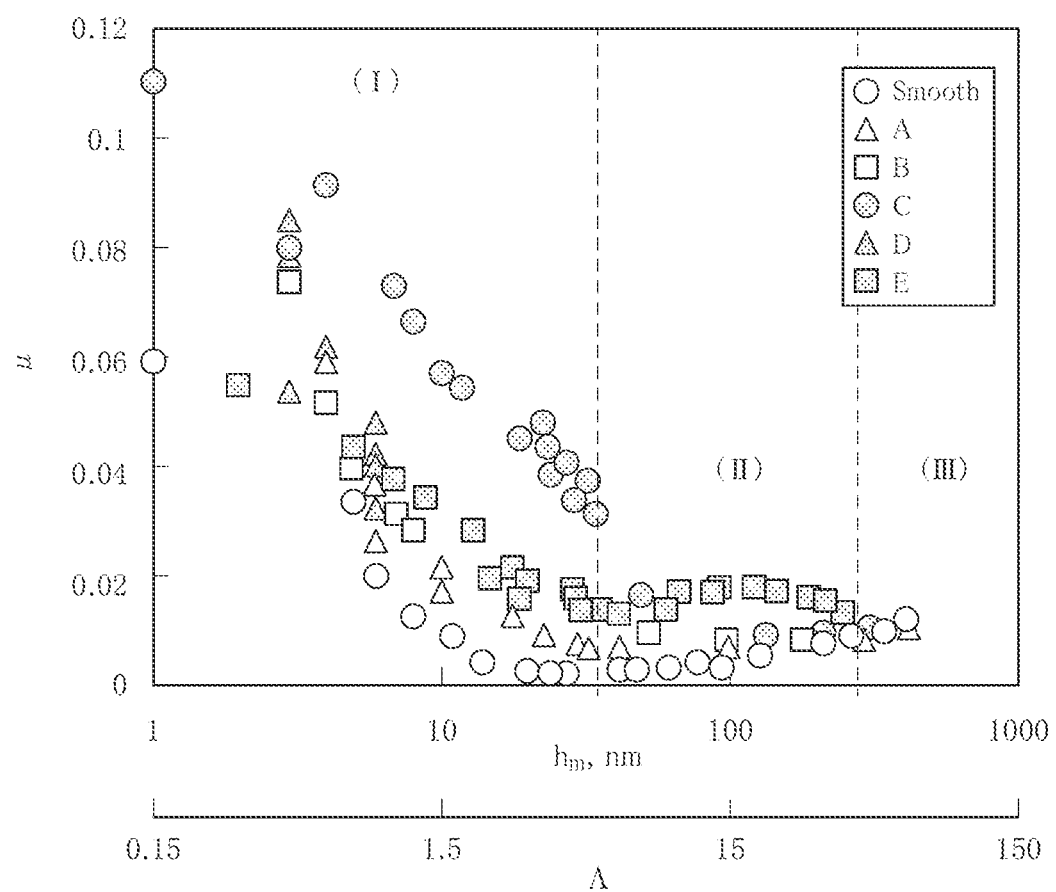
FIG. 20 is a graph of a relationship between actually measured oil film thickness and friction coefficient.

In FIG. 20, a graph of a relationship between actually measured oil film thickness and the friction coefficient is illustrated. The oil film parameter $\Lambda$ in the lower row of the abscissa was calculated from hm and composite roughness of the roughness of a ball surface except groove portions and the disk roughness. As illustrated in the drawing, it is revealed that, in the mixed lubrication region (I), the friction coefficient increases as the area ratio increases, as described afore.

Since a portion of the oil film having a minimum thickness is formed at a groove edge portion as illustrated in FIG. 18, it is considered that direct contact in the mixed lubrication starts from the groove edge portion. It is conjectured that, for that reason, a surface with a larger groove area ratio has a higher frequency of direct contact and a correlation between the area ratio and the friction has appeared.

On the other hand, in the hydrodynamic lubrication region (II) in the vicinity of a point at which the oil film thickness is 100 nm ($\Lambda$=15), the friction coefficient tends to slightly increase when the groove depth is large. It is considered that, since, in this region, the oil film exists in a sufficient amount, the friction slightly increased because of increase in resistance against shear of the oil film, instead of increase in friction due to direct contact. Note, however, that it is revealed that the degree of increase in the friction coefficient is smaller than that influenced by the groove area ratio in the mixed lubrication and the increase in the friction coefficient needs not be controlled.

It is further revealed that, when the oil film thickness becomes sufficiently large as in the region (III), the friction coefficient becomes the same as that of the smooth surface regardless of the groove shape. From the above description, it can be said that influence that grooves exert on friction depends on not only groove shapes but also lubrication conditions.

CONCLUSION

As described in the foregoing based on the example of the present invention, as a result of measurement of oil film thickness and friction under rolling-sliding conditions by use of balls with parallel grooves, the following has been revealed.

1) The oil film thickness locally decreases at a groove edge portion. In addition, the oil film thickness decreases not only at a groove edge portion but also over the entire range depending on groove area ratios.

2) In the mixed lubrication region, the friction increases in association with increase in the groove area ratio.

3) In the hydrodynamic lubrication region, the friction slightly increases as groove depth increases.

Therefore, the present invention can provide a surface roughness control method described in "Technical Problem", based on the above-described knowledge. In other words, the surface roughness control method based on the example of the present invention measures oil film thickness and friction under rolling-sliding conditions using a ball with parallel grooves and, from a result of the measurement, controls the groove area ratio of the parallel grooves to a predetermined value or less in such a way as to satisfy a control condition for desired surface roughness, based on knowledge that, in the mixed lubrication region, the friction becomes large in association with increase in the groove area ratio of the parallel grooves because the oil film thickness locally decreases at the groove edge portions of the parallel grooves or the oil film thickness decreases not only at the groove edge portions but also over the entire range depending on the groove area ratios. The control condition for desired surface roughness includes conditions for the friction coefficient of a sliding surface, bearing torque, and the like.

Accordingly, when the surface roughness control method described above is used, by using a confirmation result of influence of parallel grooves on oil film thickness and friction under rolling-sliding conditions, it is possible to control the groove area ratio of grooves to a predetermined value or less in such a way as to satisfy a control condition for desired surface roughness.

Thus, the surface roughness control method enables a roughness control method capable of satisfying a control condition for desired surface roughness under rolling-sliding conditions when parallel grooves exist on the surface to be provided. When the surface roughness control method is employed in a program, the surface roughness control method is applicable to, for example, various types of devices for automatically controlling a series of steps in grinding processing of a work.

REFERENCE SIGNS LIST

1 Driving shaft
2 Disk
3 Ball
4 Rotation axis
10 Test device
11 Outer ring
12 Inner ring
13 Tapered roller
14 Large flange portion
15 Clearance groove
20 Tapered roller bearing
31 Plateau portion
32 Groove portion
A to E Specimen
d Contact ellipse formed by contact between a large flange portion and an end surface of a roller
H Height of a contact point between a large flange portion and an end surface of a roller
R Radius of a roller head portion
L Surface pressure

The invention claimed is:

1. A process of making a sliding member comprising acquiring a correlation between a friction coefficient and an oil film parameter using a mechanical sliding surface model comprising two sliding members having mutual sliding surfaces lubricated with lubricant;

calculating a composite roughness using a core portion level difference or a sum of the core portion level difference and reduced peak height;

calculating the oil film parameter by dividing an estimated or measured oil film thickness of lubricant between the mutual sliding surfaces of the two sliding members by the composite roughness;

setting a target value for surface roughness of the mutual sliding surfaces of one or more of the two sliding members required to be controlled from the composite roughness; and processing one or more of the two sliding members to have a surface roughness satisfying the target value.

2. The process of claim 1 further comprising:

calculating a target oil film parameter value corresponding to the target value from the correlation between the friction coefficient and the oil film parameter; and setting a target value for a core portion level difference of surface roughness of the sliding surface required to be controlled or a target value for a sum of a core portion level difference and reduced peak height of surface roughness of the sliding surface required to be controlled.

3. The process of claim 2, further comprising:

setting a target value for a core portion level difference of surface roughness of the sliding surface required to be controlled or a target value for a sum of a core portion level difference and reduced peak height of surface roughness of the sliding surface as an acceptance criterion of a surface of the sliding member.

4. The process of claim 3, further comprising:

processing the sliding surface based on whether or not a value Svr representing a ratio of a valley portion within surface unevenness of the sliding surface satisfies a formula below:

Svr≤a predetermined value.

5. A production method for a producing sliding mechanism having sliding members with a lubricate disposed between sliding surfaces of the sliding members, comprising:

producing the sliding mechanism, using the process of claim 3.

6. The process of claim 2, wherein the core portion level difference and the reduced peak height are two-dimensional roughness parameters (Rk and Rpk).

7. The process of claim 6, further comprising:

setting a target value for a core portion level difference of surface roughness of the sliding surface required to be controlled or a target value for a sum of a core portion level difference and reduced peak height of surface roughness of the sliding surface as an acceptance criterion of a surface of the sliding member.

8. The process of claim 7, further comprising:

processing the sliding surface based on whether or not a value Svr representing a ratio of a valley portion within surface unevenness of the sliding surface satisfies a formula below:

Svr≤a predetermined value.

9. The process of claim 1, wherein the core portion level difference and the reduced peak height are two-dimensional roughness parameters (Rk and Rpk).

10. The process of claim 1, wherein the core portion level difference and the reduced peak height are three-dimensional roughness parameters (Sk and Spk).

11. The process of claim 1, further comprising:

setting a target value for a core portion level difference of surface roughness of the sliding surface required to be controlled or a target value for a sum of a core portion level difference and reduced peak height of surface roughness of the sliding surface as an acceptance criterion of a surface of the sliding member.

12. The process of claim 11, further comprising:

processing the sliding surface based on whether or not a value Svr representing a ratio of a valley portion within surface unevenness of the sliding surface satisfies a formula below:

Svr≤a predetermined value.

13. The process of claim 12, wherein the ratio Svr of a valley portion within surface unevenness is calculated from 100-Mr2 or 100-Rmr, wherein Mr2 and Rmr are two-dimensional roughness parameters, Mr2 is a material ratio of a core portion of the sliding surface required to be controlled, Rmr is a relative material ratio of the sliding surface required to be controlled, and the formula defines a range in which a deviation amount $\Delta\mu$ from a reference is equal to or less than a certain value.

14. The process of claim 12, wherein the ratio Svr of a valley portion within surface unevenness is calculated from 100-Smr2 or 100-Smr, Smr2 and Smr are three-dimensional roughness parameters, Smr2 is an areal material ratio of a core portion of the sliding surface required to be controlled, Smr is a relative areal material ratio of the sliding surface required to be controlled, and the formula defines a range in which a deviation amount $\Delta\mu$ from a reference is equal to or less than a certain value.

15. A production method for producing a sliding mechanism having sliding members with a lubricant disposed between sliding surfaces of the sliding members, comprising:

producing the sliding mechanism using the process of claim 11 to make the sliding members.

16. The production method for the sliding mechanism of claim 15, wherein the sliding members are one of:

constituent elements of a rolling bearing, constituent elements of a sliding bearing, or constituent elements of a ball screw.

17. The production method for the sliding mechanism of claim 16, wherein the sliding members comprise a roller head portion and a large flange portion of a tapered roller bearing; and the production method further comprises:

controlling the surface roughness between mutual facing surfaces of the roller head portion and the large flange portion to be Rk, or Rk+Rpk or less.

18. The production method for the sliding mechanism of claim 17, further comprising:
   processing surface roughness of a sliding surface of the roller head portion using Rk+Rpk as a parameter; and
   processing surface roughness of a sliding surface of the large flange portion using Rk as a parameter.

19. The process of claim 11, further comprising:
measuring friction under a rolling-sliding condition using the mechanical sliding surface model, the model comprising:
   a ball, and
   a groove; and
based on a result of the measurement, controlling a groove area ratio of the groove to a predetermined value or less in such a way as to satisfy a control condition for a desired surface roughness.

20. The process of claim 19, wherein
the groove comprises parallel grooves.

* * * * *